United States Patent
Cedo Perpinya et al.

(10) Patent No.: US 9,538,312 B2
(45) Date of Patent: Jan. 3, 2017

(54) INTERACTIVE INFORMATION METHOD AND SYSTEM

(75) Inventors: Josep Cedo Perpinya, Barcelona (ES); David Maso Mas, Seva Barcelona (ES); Marc Dalmau Ballester, Barcelona (ES); Jose Manuel Gil Lozano, Barcelona (ES)

(73) Assignee: Wilico Wireless Networking Solutions, S.A., Barcelona (ES)

(*) Notice: Subject to any disclaimer, the term of this patent is extended or adjusted under 35 U.S.C. 154(b) by 1125 days.

(21) Appl. No.: 12/021,572

(22) Filed: Jan. 29, 2008

(65) Prior Publication Data

US 2008/0248781 A1  Oct. 9, 2008

(30) Foreign Application Priority Data

Jan. 31, 2007  (ES) .................................. 200700253
Apr. 2, 2007  (GB) .............................. GB0706429.8

(51) Int. Cl.
H04M 3/42  (2006.01)
H04L 29/06  (2006.01)
(Continued)

(52) U.S. Cl.
CPC ............ *H04W 4/008* (2013.01); *G06F 3/0488* (2013.01); *G06Q 20/3278* (2013.01);
(Continued)

(58) Field of Classification Search
CPC ........... H04W 4/02; H04W 8/18; G06Q 30/02; G06Q 30/0601
(Continued)

(56) References Cited

U.S. PATENT DOCUMENTS 6,931,254 B1 * 8/2005 Egner ................ G06Q 30/0269
                                                   455/456.1
2002/0094787 A1  7/2002 Avnet et al.
(Continued)

FOREIGN PATENT DOCUMENTS

DE  102004033841  2/2006
EP       1120706  8/2001
(Continued)

*Primary Examiner* — Dung Hong
(74) *Attorney, Agent, or Firm* — Carter, DeLuca, Farrell & Schmidt, LLP

(57) ABSTRACT

Methods of providing information using an interactive information device (2) are provided. A first method comprises displaying on a display (3) of an interactive information device (2) information selected from information for display stored in a memory of or accessible to the interactive information device (2), establishing a communications connection between the interactive information device (2) and a mobile communications device (20), and transmitting data to the interactive information device (2) from the mobile communications device (20) and/or from the interactive information device (2) to the mobile communications device (20). A further method comprises a tag device detecting the presence of a mobile communications device (20), transmitting data stored in the tag device to the mobile communications device (20) or an information device (2) in response to the detection, preferably transmitting at least some of the data, received from the tag device, from the mobile communications device (20) to an information device (2), and displaying on a display (3) of the information device (2) information relating to the transmitted data received from the mobile communications device (20). One or more systems and/or means for carrying out the methods are provided.

49 Claims, 5 Drawing Sheets

(51) Int. Cl.
  *H04L 29/08* (2006.01)
  *H04M 1/00* (2006.01)
  *H04W 4/00* (2009.01)
  *G06Q 30/02* (2012.01)
  *G09G 3/20* (2006.01)
  *H04B 5/00* (2006.01)
  *H04B 7/26* (2006.01)
  *G06Q 20/32* (2012.01)
  *H04W 76/02* (2009.01)
  *G06F 3/0488* (2013.01)
  *H04W 8/00* (2009.01)

(52) U.S. Cl.
  CPC ........... *G06Q 30/02* (2013.01); *G09G 3/2096* (2013.01); *H04B 5/0062* (2013.01); *H04B 7/26* (2013.01); *H04W 8/005* (2013.01); *H04W 76/02* (2013.01); *H04W 76/023* (2013.01); *G09G 2370/16* (2013.01)

(58) Field of Classification Search
  USPC ............... 455/414.1–414.4, 41.1, 566, 556.1
  See application file for complete search history.

(56) References Cited

U.S. PATENT DOCUMENTS

| | | | |
|---|---|---|---|
| 2002/0170961 A1* | 11/2002 | Dickson | G06K 7/0008 235/383 |
| 2003/0114199 A1* | 6/2003 | Takeyasu | 455/566 |
| 2004/0068439 A1 | 4/2004 | Elgrably | |
| 2004/0266460 A1* | 12/2004 | Reynolds | G06F 3/04817 455/457 |
| 2006/0018450 A1* | 1/2006 | Sandberg-Diment | 379/93.12 |
| 2006/0079214 A1* | 4/2006 | Mertama | H04M 1/7253 455/414.1 |
| 2007/0024580 A1* | 2/2007 | Sands | G06F 3/011 345/156 |
| 2007/0288309 A1* | 12/2007 | Haberman et al. | 705/14 |
| 2008/0052169 A1* | 2/2008 | O'Shea et al. | 705/14 |
| 2008/0089288 A1* | 4/2008 | Anschutz et al. | 370/331 |
| 2008/0183568 A1* | 7/2008 | Ida | G06Q 30/02 705/14.54 |
| 2008/0191878 A1* | 8/2008 | Abraham | G06Q 30/0603 340/572.1 |
| 2010/0041380 A1* | 2/2010 | Hewes et al. | 455/414.4 |

FOREIGN PATENT DOCUMENTS

| | | |
|---|---|---|
| EP | 1294163 A | 3/2003 |
| EP | 1393677 | 3/2004 |
| WO | 0101711 A | 1/2001 |
| WO | 2005/076482 | 8/2005 |

* cited by examiner

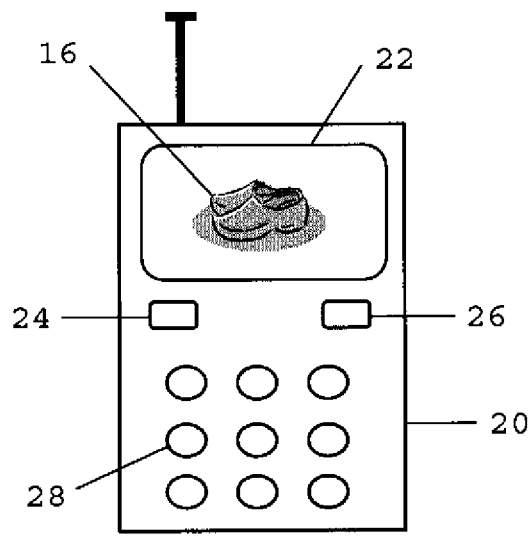
Figure 1(c)
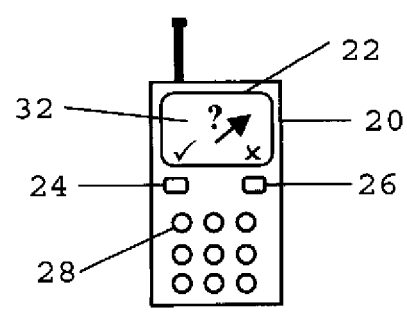
Figure 1(d)

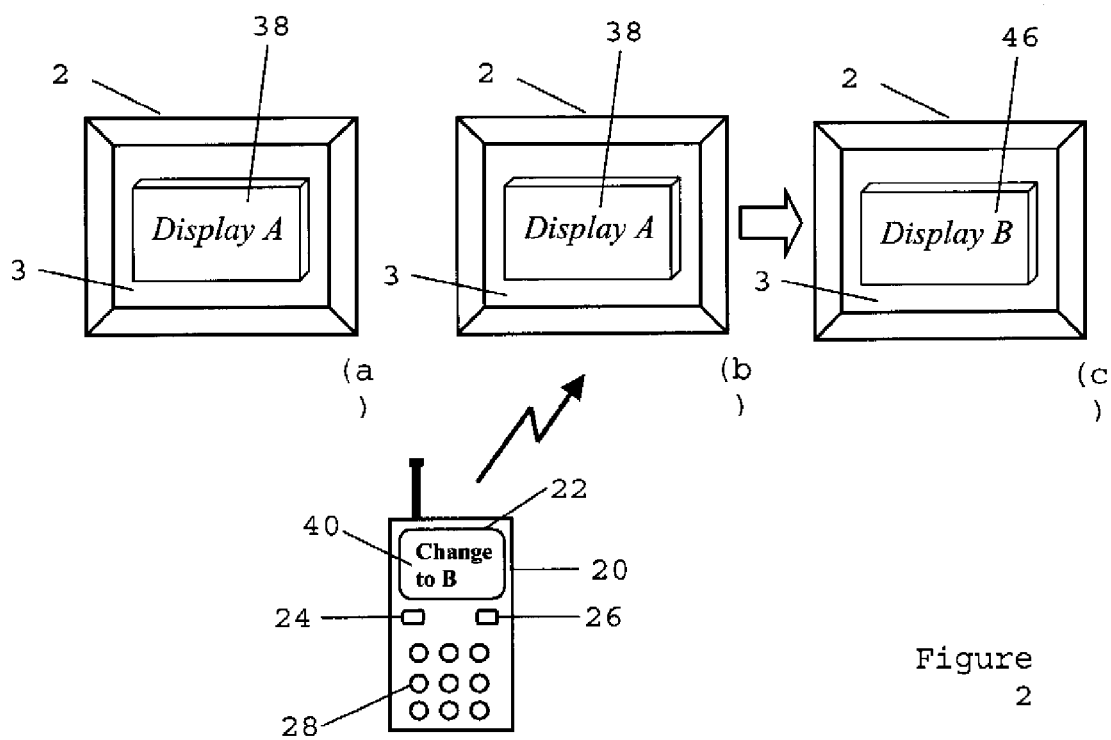
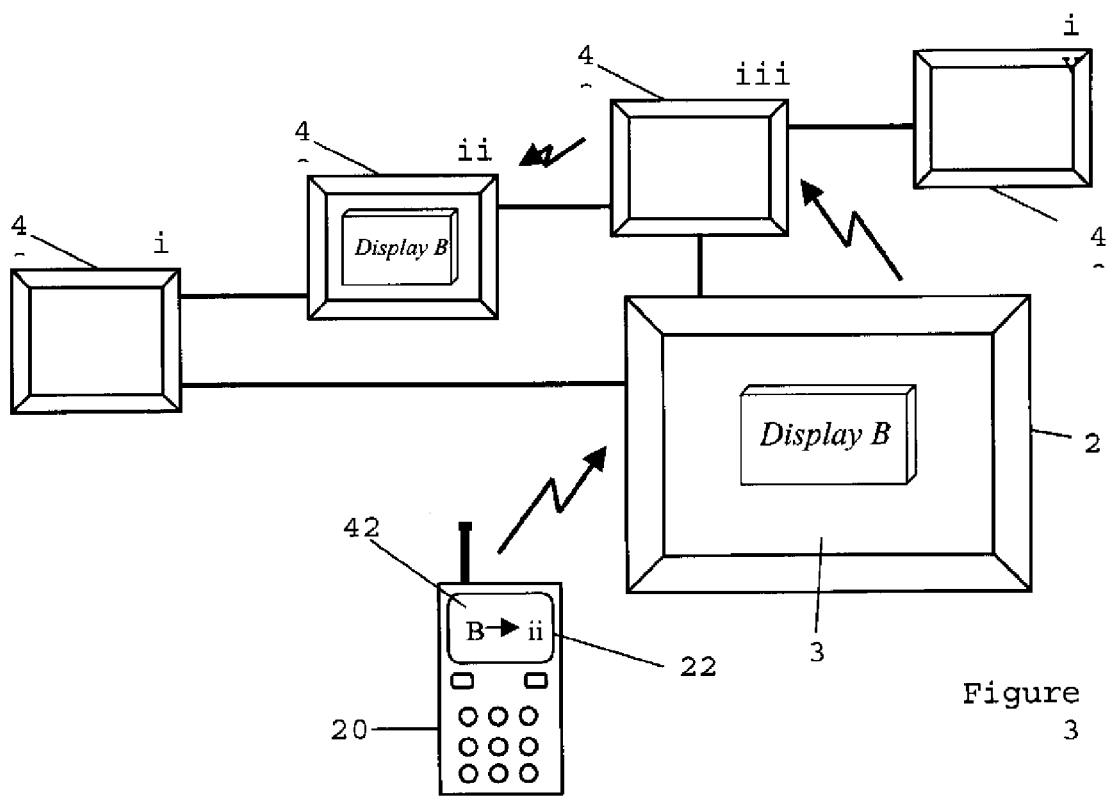

INTERACTIVE INFORMATION METHOD AND SYSTEM

The present invention relates to methods of providing information and to interactive information systems, and in particular to, preferably touch-screen, interactive methods and systems for providing information to, and for use with, mobile communications devices, particularly when such devices are in close proximity with the touch-screen interactive information systems.

It is has long been known to provide information services in both public and private environments to enable people to obtain information for example about the environment and/or other related or unrelated information. Information can be provided using, for example, an information display. These displays range from simple displays such as signs, instructions or other indicators, and provide the viewer with a great variety of useful information such as directions, operating instructions, warnings, advertisements, product or service details, availability or timing information, etc. Such displays are useful but are limited in the information they can convey and if the information changes, the display must be replaced.

It is becoming increasingly desirable to provide information displays that convey a greater amount of information and/or more detailed information. It is also desirable to provide information displays that can be readily updated. In order to meet these demands, electronic display systems have been proposed and are widely used where it is necessary to provide a large amount of information that needs regular updating.

For example, electronic displays are commonly used in airports, stations and the like to display arrivals and departures information. However even though these screens can be updated from a central information source, there is still a limit to the amount of information that can be displayed on a single screen and it is often necessary to configure the displays to scroll through more than one page of information on the screen, thus increasing the time it takes to obtain specific information from the display, since it is necessary to wait for the appropriate page to be displayed.

In an attempt to overcome the above problems, and also to provide displays that are capable of providing a wider variety of information and a greater level of detail of information, there have been proposed electronic displays that are interactive and allow a user to browse through a large amount of available information and to select the information that they wish to have displayed. These interactive displays are particularly suited to providing tourist and/or consumer information where the user may require specific information from a large amount of data regarding, for example, the surrounding environment, available services, times and places, etc.

For example, in a hotel it is desirable to have an interactive display in the reception, the display containing information such as the availability and location of hotel services (restaurant/pool/bar locations and opening times for example) and also information relating to the area around the hotel and the resort in which it is located, such as restaurants in the area, excursions that are available, car hire companies, hospitals and emergency rooms, etc. Visitors to the hotel are able browse through all of the information, for example by selecting a topic or group of data from a menu structure showing the available types of information, and requesting to view more details on a particular entry.

Interaction with the display can be via any known method such as, for example, using a keyboard or other buttons or keys provided on the display, or by having a touch-sensitive screen, etc.

Such interactive display systems are useful for presenting a wide variety of information to a user and details regarding selected information whilst the user interacts with the system. However problems arise when the user wishes to refer to the selected information after moving away from the display.

For example, with the hotel example, if a user has selected information on a restaurant and they wish to make a booking, they must memorize the number of the restaurant, or write the number down. This problem is exacerbated when the information the user has selected is more detailed than simply a phone number. For example, if the user wishes to take away details of how to get to the restaurant, or a sample menu etc., then it is impractical to memorize these details or to write them all down. Whilst it may be possible to alleviate these problems by providing a printing device, this is not a satisfactory solution since the user cannot interact with the printed information if, for example, they wish to obtain further information that has not been printed. There exists, therefore, scope for improvement in providing information from information display devices and systems.

Thus according to a first broad aspect of the present invention there is provided a method of providing information on an interactive information device, the method comprising:

displaying on a display of an interactive information device information selected from information for display stored in a memory of or accessible to the interactive information device;

establishing a communications connection between the interactive information device and a mobile communications device; and transmitting data to the interactive information device from the mobile communications device and/or from the interactive information device to the mobile communications device.

According to a second broad aspect of the present invention there is provided a system for providing information, the system comprising:

an interactive information device comprising:

a memory for storing information selectable for display;

a display for displaying the particular information selected;

means for establishing a communications connection between the interactive information device and a mobile communications device; and means for transmitting data to the mobile communications device and/or for receiving data from the mobile communications device.

The present invention provides a method of and system for selecting particular information that it is desired to view on a display screen of an interactive information device from data that is stored for display on the device. A communications connection between the interactive information device and a mobile communications device enables data to be transferred to the interactive information device from the mobile communications device and/or vice-versa.

Therefore, in preferred arrangements at least, data for example can be taken from the interactive information device and stored on the mobile communications device enabling the data to be taken away from the interactive information device, and data can be communicated to the interactive information device from the mobile communications device and, for example, stored in the memory of the interactive information device for selecting for display on the display screen.

In this manner selected information is portable both to and from the interactive information device and can be accessed, as set out below or in any other suitable manner, from the mobile communication device when the user is away from the interactive information device, and/or can be accessed from either or both of the interactive information device and the mobile communications device when the user is in, e.g., close proximity to the interactive information device.

It should be noted that the mobile communications device can comprise any suitable portable device having means for communicating with another device. For example, in a particularly preferred embodiment, the mobile communications device comprises a cellular/mobile phone, a headset for a phone, such as a Bluetooth headset, a personal digital assistant (PDA), a BlackBerry handset or device, a laptop or other, preferably portable, personal computing device, or any other similar or appropriate device (and may, for example, be a combination of any of the above or other portable communications devices).

The interactive information device can comprise any suitable device having interaction means as discussed below and a display for presenting information. For example the interactive information device may comprise and preferably does comprise a totem having, for example at least one display and means for enabling a user to interact with the totem display or displays.

Preferably the interactive information device comprises a, preferably built-in or integrated, memory, although in some embodiments the memory could be external to the device, such as an external drive or on a server remote from the device, or may comprise a memory card that is removable from the device, etc.

The interactive information device comprises any suitable display means, and may for example comprise a cathode-ray tube or the like. In a particularly preferred embodiment, the interactive information device comprises a flat-screen display, for example a plasma screen and/or a liquid crystal display (LCD) or the like.

The communications connection established between the interactive information device and the mobile communications device can be any suitable connection and may be direct, i.e. a communications connection or link between the mobile communications device and the interactive information device such as a cable therebetween or a direct wireless link etc., and/or may be indirect, i.e. a communications connection or link between the interactive information device and one or more intermediate devices and a communications connection between the mobile communications device and one or more of the intermediate devices, such that communications between the interactive information device and the mobile communications device are carried out through the (one or more) intermediate device(s).

Each one of the communications connections of the present invention and its various embodiments, unless otherwise specified, can be wired and/or wireless using one or more appropriate communications protocols or wireless communications protocols, etc.

In a preferred embodiment, the step of establishing a communications connection between the interactive information device and the mobile communications device comprises establishing a short-range wireless connection, such as a Bluetooth connection, an infrared connection, a Wi-Fi connection, a Wibree connection, or the like. Preferably the short-range wireless connection is effective for communications over a distance of up to about 100 meters, preferably over a distance of up to about 50 meters, more preferably over a distance of up to about 10 meters, and in some embodiments, preferably over a distance of a few meters, for example over about 2 to 3 meters, or preferably less than 2 meters or more preferably between about a few centimeters to about 1 meter.

Having a wireless communication range of up to 100 meters is advantageous in that it allows, for example, multiple information devices to be interconnected by wireless connection, and/or multiple mobile communications devices to be connected to one or more information devices, but such a broad range may increase the likelihood of one or more interference signals interfering with communications.

Having a wireless communications range that is much smaller, for example less than about 10 meters, reduces the likelihood of interference but enables fewer devices to connect together.

In a particularly preferred embodiment, a short-range wireless connection is established between the mobile communications device and the interactive information device, the range of the short-range connection being of the order of a few centimeters to a few meters, e.g. about 10 centimeters to about 1 or 2 meters, thus enabling the devices to communicate with a reduced risk of interference when the mobile communications device is close to the interactive information device.

This is particularly advantageous for certain embodiments described below, wherein information is displayed on the interactive information device automatically in response to communication between the interactive information device and the mobile communications device, since if the wireless communication were much wider ranging, then other mobile communications devices in the wider area could undesirably affect the information displayed. This will be further discussed below in relation to the appropriate embodiments.

As set out above, the method of providing information on an interactive information device comprises, inter alia, selecting particular information from data stored in a memory of the interactive information device for display. Any suitable means for enabling selection of information for display can be provided at the interactive information device. For example a keyboard and/or a mouse could be provided at the interactive information device.

Therefore in a preferred embodiment, the method or system of providing information further comprises the step of or means for providing an input means at the interactive information device for user operation thereof. For example, the input means may comprise keys or buttons provided on the interactive information device itself. However if the display screen of the interactive information device is large and/or if a large amount of information is displayed on the display screen, navigation and selection of the desired information can be awkward and time consuming.

Therefore in a preferred embodiment at least the input means comprises touch-sensitive means of and/or associated with the display screen. In this manner, the user can select information from the display screen simply by pressing the touch-sensitive means associated with the information.

Preferably the step of selecting the particular information further comprises operating the input means to select the particular information from the data stored in the memory of the interactive information device. In this way, the selected information is then displayed by the display screen as the particular information.

Alternative or additional means of interacting with an interactive information device include any, some or all of the following: voice command control of the interactive information device, providing a remote device to control the interactive information device, using a mobile communications device as a or the remote control, etc.

After a user has selected particular information for viewing and the particular information has been displayed on the display screen of the interactive information device, the user may wish to retain the information. The user could, for example, memorize the information and/or could write down the information, which may be appropriate for small amounts of information, such as a single address or telephone number for example. It is not however particularly appropriate when the information is more detailed, more complex, and/or contains images or the like.

Therefore in a particularly preferred embodiment the method and system of providing information further comprises the steps of or means for:

prompting the mobile communications device to permit transmission of at least a subset of the particular information selected and displayed on the display screen;

determining whether a response is received from the mobile communications device;

transmitting the subset of the particular information to the mobile communications device when a positive response is received; and storing in the memory of the mobile communications device the subset of the particular information.

Therefore an advantageous method of retaining at least a part of the information displayed on the display screen of the interactive information device is provided. Once the information has been downloaded as described and stored on the mobile communications device, it can be accessed in a manner of different ways to provide the information to the user.

In a particularly preferred embodiment, the method of providing information further comprises displaying on a display means of the mobile communications device the subset of the particular information, or at least a part thereof.

Therefore the user of the mobile communications device can view the information displayed on the screen whilst still present at the interactive information device and/or after leaving the location of the interactive information device. In the latter case, the user can use the information displayed on the mobile communications device and does not need to memorize the information even if it is required at a later time and/or in a different location.

In the preferred embodiment wherein at least part of the data is transmitted from the interactive information device to the mobile communications device for storage and/or display thereon, the data is sent in any suitable format. For example, the data can be sent in its current form, or in a compressed or otherwise compact form, or it can be formatted to resize the information to be displayed on a smaller screen (since typically the display on the mobile communications device will be smaller than the display screen of the interactive information device), and/or it can be reshaped to a different aspect ratio (e.g. changed from 16:9 format to a 4:3 ratio, or other preferred ratio, and vice versa).

However, merely resizing and/or reformatting the information in this or any other standard manner often provides only a generic image that is not particularly appropriate for display on all mobile communications devices. Furthermore, it may not be appropriate to display all of the information transmitted to the mobile communications device at the same time, as the mobile communications device display may be too small and/or have insufficient resolution to adequately reproduce the information, or to reproduce it such that it is readable and/or viewable.

Therefore it may be desired to display only some of the information, or to display some or all of the information at different times, or on different pages presented on the display for selection, or to display the information arranged in a menu structure with further information selectable via the appropriate menu, etc.

In a preferred embodiment therefore the method or system of providing information further comprises the step of or means for configuring, prior to transmission to the mobile communications device, the subset of the particular information for compatibility with the display means of the mobile communications device.

This is particularly advantageous because the information can be configured to be displayed appropriately on the mobile communications device based on, for example, the model number and/or manufacturer of the phone and/or any other suitable device identification data. This can be achieved in a number of ways, for example by the interactive information device requesting device identification data from the mobile communications device and/or by the mobile communications device automatically sending its relevant device identification data to the interactive information device, for example when the communications connection between the devices is established.

Once the interactive information device has the required identification data, the subset of the particular information can be configured for compatibility with the now determined type of mobile communications device, for example by reference to a configuration profile for such a device stored in the interactive information device memory, or stored in and retrieved from the mobile communications device, or by execution of an appropriate configuration application, etc. A further discussion of methods and devices for identifying a mobile communications device that can be used for the preferred embodiments of the present invention is disclosed, for example, in WO 2066/084927.

By configuring the information as set out above the displayed information can be sized and shaped to fit the mobile communications display, data that may clutter or obscure the data to be displayed can be removed, fonts and/or images, etc., can be enlarged if appropriate, and/or any other suitable modification or configuration of the data can be carried out.

In a particularly preferred embodiment, the information to be displayed on the mobile communications device is reconfigured to be presented as one or more menus, the menus being browseable via one or more input means of the mobile communications device, such that all the desired data can be displayed on the mobile communications device but as or via a set of menus and sub-menus etc. to avoid displaying an over-crowded, confusing and/or otherwise unreadable display.

Therefore in a preferred embodiment, the subset of the particular information displayed on the display means of the mobile communications device comprises an interactive menu structure providing a plurality of options.

The menu structure presented to the user of the mobile communications device allows the user to select further information to be displayed on the display of the device as desired. The further information may be contained in the subset of data stored in the memory of the mobile communications device. However, the amount of data storable in the memory of the mobile communications device, and therefore the amount of further information available for selection by the user, is limited by the size of the memory.

Typically such mobile communications devices have a relatively small storage capacity, necessitated by physical size, cost, power and operational considerations and therefore the amount of data storage is limited. This can be a particular disadvantage when it is desired to provide multimedia information to the user, since images and more particularly streaming media such as videos can easily exceed the relatively small capacity of a mobile communications device memory.

Therefore in a particularly preferred embodiment the method or system of providing information further comprises the steps of or means for:

in response to user selection of an option from the interactive menu structure, determining whether further information regarding the selected option is contained in the subset of the particular information stored in the memory of the mobile communications device; and if it is determined that further information regarding the selected option is contained in the subset of the particular information stored in the memory of the mobile communications device, retrieving and displaying the further information on the display means of the mobile communications device; or if it is determined that further information regarding the selected option is not contained in the subset of the particular information stored in the memory of the mobile communications device, displaying a message.

Preferably the message is displayed on the display means of the mobile communications device and/or on the interactive information device.

Preferably the message comprises a prompt requesting input from the user of the mobile communications device in order to display the further information regarding the selected option.

More preferably the method or system further comprises the steps of or means for:

retrieving the further information regarding the selected option from the memory of the interactive information device when a positive response to the message is detected; and displaying the retrieved information on the display screen of the interactive information device and/or on the display means of the mobile communications device.

In this manner, some data files, for example those that are large, that the user may wish to view can be stored in the memory of the interactive information device, thereby avoiding issues with the potentially relatively small capacity of the mobile communications device memory. However when the user of the mobile communications device wishes to view the data files, as indicated for example by selecting the desired information, or a link thereto, the menu structure provides a prompt at the mobile communications device and/or at the interactive information device. The prompt, for example, asks the user if they wish to download the further information that they wish to view from the interactive information device.

If the user is still within communication range of the interactive information device, and if the user responds positively to the prompt, i.e. if the user indicates that they do wish to retrieve and view further information from the interactive information device, then this message is relayed to the interactive information device and the information to be viewed is either displayed on the interactive information device and/or the information is transmitted to the mobile communications device and displayed on the display thereof, as appropriate. In this manner, the user of the mobile communications device has access to a far greater range of information, including large data files such as multimedia information and the like, than could normally be viewed on the display of the mobile communications device which may for example have a relatively low capacity memory compared with the interactive information device.

As set out above, a user can interact with the interactive information device and can select and view desired information on the interactive information device and/or on the mobile communications device. The mobile communications device can store at least some of the information for viewing after the communications connection with the interactive information device is no longer established, for example because the user has moved out of the communications range of the interactive information device.

This is particularly advantageous because the user can download to the mobile communications device detailed information such as, for example, directions to a place of interest, detailed information about the place of interest (e.g. for a restaurant, this could be the menu, opening times, contact details, reviews, nearby bars and accommodation, etc.) and this information can be taken away by the user and referred to at a later time, for example if the information comprises details of how to reach a venue, the map can be displayed on the display of the mobile communications device as the user navigates their way to the venue.

A further example of an advantageous use of this system is where the interactive information device comprises an information display in, for example, a shopping centre/mall or other large commercial premises.

When a user enters the shopping mall wishing to purchase a particular product, but does not know which shops stock the product required or where those shops are located, then the user can interact with the information display to select a product of interest and information related to that product (e.g. shops that sell the product, a map thereto, details of a particular product for sale in a particular shop, etc.).

This information and/or further information that, for example, the information display determines might be of interest, is transmitted to a mobile communications device of the user for accessing and/or viewing thereon at the appropriate time.

When the user reaches the shop of interest, in order to facilitate purchase of the particular product, it is desirable to be able to show the information to the shop assistant relating to the particular product.

However, as set out above, the amount of information storable on the mobile communications device may be limited by memory size and furthermore the display on the mobile communications device is relatively small, and so the information required to identify the product may not be not stored on the mobile communications device, or even if it is stored thereon, when reproduced on the display of the mobile communications device it may be too small, too complex and/or too unclear to adequately confer the required information to the shop assistant.

Therefore in a particularly preferred embodiment, the method or system of providing information further comprises the step of or means for: providing a further information device and preferably the further step of or means for storing in a memory of or accessible to the further information device data comprising at least a portion of the data stored in the memory of the interactive information device.

This is particularly advantageous as the further information device can be placed at a suitable location such that, for example, the mobile communications device can interact with the further information device when out of the communications range of the first interactive information device.

By having at least a portion of the data stored in the memory of the interactive information device also stored in the memory of the further information device, the user can access the information that they have already selected as being of interest by interaction with the further information device. In the shopping mall example, the further information device could be located, for example, in one or more shops in the mall. This is advantageous because the user can find the information they require by interaction with the interactive information device which is typically placed at a central, convenient location in the mall, and then can recall the information by interaction with the further information device in the shop having the product the user might wish to purchase.

However, in the above example or indeed in any other application of the embodiments of the present invention, the user may find it is inconvenient to repeat the actions carried out to find the information of interest, and/or the user may not be able to recreate the information exactly as desired.

For example in the shopping mall example, the user may forget which options they navigated through to find the data of interest, and/or the further information device may not contain all the options and/or information that the interactive information device contains, and therefore they cannot find the information for which they are searching.

Therefore in a preferred embodiment, the method of or system for providing information further comprises the steps of or means for:

prompting the mobile communications device to permit transmission of image data thereto; and storing the image data in the memory of the mobile communications device if a positive response is received.

This is advantageous because any interaction between the interactive information device and the mobile communications device may result in an image or the like being displayed on the display screen of the interactive information device and, for example, the image can be remembered (also preferably with details of the interactions that occurred to select the image to be displayed if desired) and stored as image data, that the interactive information device offers to the mobile communications device.

As set out below, if the mobile communications device allows the data to be transmitted thereto and to be stored in a memory thereof, the data is then taken with the mobile communications device and can be used, if desired, to more readily interact with other information devices.

Preferably the step of or means for prompting the mobile communications device to permit transmission of the image data further comprises prompting the mobile communications device at a predetermined time.

Therefore the interactive information device prompts the mobile communications device to store the image data when appropriate, for example at regular, time-based intervals and/or after each image is displayed on the display screen of the interactive information device, etc.

In a particularly preferred embodiment, the step of or means for prompting the mobile communications device to permit transmission of the image data comprises prompting the mobile communications device to permit transmission of the image data in response to transmission of a signal from the mobile communications device to the interactive information device indicating that communication therebetween is to be terminated.

This is advantageous because, if the user indicates that they are about to leave the communication area of the interactive information device, the interactive information device offers to send image data to the mobile communications device that the user might wish to take with them.

The image data comprises any suitable information, and preferably comprises at least text data and may further comprise images, streaming media such as videos, etc. It is particularly preferred for the image data to relate to the particularly information that the user selected to view on the display screen of the interactive information device, since this is an indication of the type of information that the user requires at this time. However, as set out above, the mobile communications device may have a limited memory capacity and so it may be desirable to avoid sending all of the data viewed on the interactive information device to the mobile communications device.

Therefore in a preferred embodiment, the image data comprises data identifying the particular information displayed on the display screen of the interactive information device. The image data may comprise some of the specific images viewed on the display screen of the interactive information device or it may not, but preferably the data at least comprises means for identifying the specific images that were displayed.

In this manner, when the mobile communications device returns to the interactive information device and interacts again with the device, and/or when the mobile communications device interacts with the further information device, the image data stored in the mobile communications device can provide the information device with either the images to be viewed, and/or more preferably with pointers/bookmarks indicating the particular and/or type of information that should be displayed to the user of the mobile communications device. This provides rapid and easy interaction with the appropriate information device without the user being required to perform the same navigation steps at each information device.

As set out above, the image data comprises any suitable data relating to the specific images displayed on the display screen of the interactive information device. For example, the image data comprises parts of the image displayed, or data related to or pointing to the image displayed, etc.

In a particularly preferred embodiment, the image data comprises data representing the image displayed on the display screen of the interactive information device at the time of transmission of the image data to the mobile communications device. This is advantageous because it is very likely that the last screen viewed by the user prior to, for example, ceasing interaction with the interactive information device, will show the information for which the user was specifically searching.

Therefore having image data stored on the mobile communications device that represents the last screen viewed allows the mobile communications device to display either the same image data (i.e. to display on the display of the mobile communications device the images of interest) or a modified version of the information so that the display on the mobile communications device is readable and/or not too complex.

Furthermore having image data stored on the mobile communications device that represents the last screen viewed allows the mobile communications device to provide to the next information device with which the user interacts details of, and/or a pointer to data representing, the last screen viewed.

Thus, as will be appreciated from the above in a particularly preferred embodiment data can be sent from the mobile communications device to an information device to inform the information device of a user's previous interactions with an information device (which may be the same or another information device), such as, as discussed above, identifying the last screen viewed by the user. This will then allow, e.g., a user easily to be returned to their previous interaction when they approach a new information device or the same information device again.

Preferably therefore the method of or system for providing information further comprises the step of establishing a communications connection between the mobile communications device and the same or a further information device, when the mobile communications device is within a communication range of the information device, and transmitting the data (e.g. image data) stored on the mobile communications device from an interaction with an information device to the further etc., information device.

This advantageously allows information relating, e.g., to the screen displayed by the user on an interactive information device to be relayed to a further information device, such that the user's preferences in this regard are stored on and/or can be used by the further information device.

Preferably the method of or system for providing information further comprises the steps of or means for:

identifying and retrieving appropriate data from the memory of an information device in response to receiving stored data (e.g. image data) from the mobile communications device.

In these arrangements, where the stored data is image data, the step of or means for identifying and retrieving appropriate data preferably comprises:

when the image data comprises data identifying the particular information displayed on the display screen of the interactive information device, retrieving appropriate images and/or other information related to the particular information displayed on the display screen of the interactive information device; and when the image data comprises data representing the image displayed on the display screen of the interactive information device at the time of transmission of the image data to the mobile communications device, retrieving the same image; and displaying the retrieved images and/or other information on a display of the further information device.

This arrangement will allow, for example, the further information device to retrieve from its memory and to display images that either relate to the information displayed on the display screen of the interactive information device and/or are the same as the last screen displayed on the interactive information device. The images are displayed without the user being required to navigate through options of the further information device.

This is particularly advantageous because it allows the user to see again on the further information device the information that they have previously selected, and/or to see any information related thereto that may be of interest, without all the information needing to be stored on the limited capacity memory of the mobile communications device, since the further information device contains at least some of the information in its memory. Therefore all that is required to be stored on the mobile communications device is information identifying, for example bookmarking or otherwise pointing to, the information to be displayed on the further information device, and the information itself can be retrieved from the, typically much larger capacity memory of the further information device.

Thus, in a particularly preferred embodiment, the present invention comprises transmitting from the interactive information device to the mobile communications device data identifying information to be displayed on an interactive information device, and, most preferably, the mobile communications device then transmitting that data to a, preferably different, information device.

In the shopping mall example, e.g., when the user is in a shop selling a product which the user wishes to purchase, the image data stored on the mobile phone can be transmitted to the information device in the shop, and the information device can display exactly the same information as was originally displayed on the display screen of the interactive information device (by retrieving the appropriate information from its own memory, using the pointer/bookmark sent to it from the mobile phone) and/or other images or information relating to the product.

For example the image data stored on the mobile communications device may simply comprise a product code and transmitting the product code from the mobile communications device to the shop information device causes an image of the product, as well as for example the number of that product in stock, the price, etc., to be displayed on the shop information device. This enables the shop assistant to readily identify the product that the user is interested in viewing without either party needing to navigate through any initial displays and without any confusion as to the product in question.

In a particularly preferred embodiment, interaction of the mobile communications device with the further information device causes the further information device to automatically display the last screen the user viewed on the interactive information device. For example, the further information device may automatically establish communications with the mobile communications device when the mobile communications device is within the communications range of the further information device, and automatically receive the image data and automatically display the desired information in response thereto.

In the above embodiments where interaction occurs between the mobile communications device and the further information device, it may be desirable for further interaction between these two devices to occur. For example, the further information device may contain in its memory more information about the particular information selected by the user than was contained in the memory of the interactive information device.

In the shopping mall example, the shop information device may, for example, contain more product details than the mall interactive information device, and may also contain more details of related products, offers etc., that might be of interest to the user. In such cases, the further information device could simply display the further information on the display for the user to view. However, the user may not wish to view the further information at that time.

Therefore in a particularly preferred embodiment the method of or system for providing information further comprises the step of or means for: transmitting data from the further information device to the mobile communications device, the data at least relating to the images and/or information displayed on the display of the further information device.

In this manner the user is able to view the information at their leisure, for example at a later time or at a different location, since the information can be taken away for viewing on the mobile communications device and/or on a further information device as and when desired.

For example, the user may have their own information device at their residence, such as an interactive television display or a computer, laptop or the like, to which the information can be transferred at the appropriate time.

Once the user has viewed the information on the interactive information device and/or the further information device there may be other desirable transactions that can be executed. For example, if the information displayed identifies a product and/or service, as is likely in the shopping mall example, and if the user wishes to purchase or order the product and/or service, then in preferred embodiments the purchase transaction can be carried out as a transaction between the mobile communications device and the respective information device.

In a preferred embodiment therefore, the method of or system for providing information further comprises the steps of or means for:

establishing a transaction communication between the mobile communications device and an interactive information device (e.g. at least one of the interactive information device and a further information device); and performing a transaction associated with the particular information displayed on the display screen of the interactive information device (e.g. with the images and/or information displayed on the display of the further information device).

Preferably the steps of or means for establishing the transaction communication and performing the transaction comprise operating a wireless connectivity application on each of the devices of the transaction communication.

In a particularly preferred embodiment, the wireless connectivity application is a near field communication (NFC) application or the like.

In this manner the user of the mobile communications device can securely purchase a product, service or the like, using the mobile communications device without requiring cash, credit or debit cards or other form of payment.

In this embodiment, further information can be transmitted from the information device performing the interaction in response to the purchase if desired. In the shopping mall example, the purchaser of the product could be sent promotional offers, details of other purchases, details of future stock that the shop will sell, or any other marketing information, etc.

As mentioned above, it is entirely within the scope of the present invention for the mobile communications device to additionally or alternatively carry out transactions as set out above with the interactive information device. In the shopping mall example, the user could for example complete the transaction with the interactive information device before visiting the shop and the image data displayed on the shop information device could take the form of an electronic receipt informing the shop assistant of the product the user has purchased, so that the product can be collected by the user.

The above disclosed embodiments relate to preferred methods of interaction between a mobile communications device and an interactive information device, as well as, preferably, a further information device. Other embodiments are contemplated in addition to or as an alternative to the above preferred embodiments.

In one preferred embodiment, the method of or system for providing information further comprises the step of or means for: establishing communications connections between the interactive information device and a plurality of further information display devices.

The interactive information device can be placed at any suitable location and the further information devices can be placed in any location in relation to the interactive information device as appropriate. For example the interactive information device could be generally centrally located amongst the further information devices.

In a shopping mall arrangement for example, the interactive information device could be located at the entrance to the mall, and/or in the centre of the mall, etc. Of course, two or more interactive information devices could be used in any embodiment of the invention described in this application. In the mall, the further information devices could be located in, for example, individual shops, in one or more food halls, in an associated car park, etc.

Whilst in accordance with the present invention a mobile communications device can interact with the interactive information device and/or with one or more of the further information devices, it is also advantageous in some embodiments for the interactive information device additionally to be able to communicate with at least one, preferably at least some, and preferably all of the further information devices.

Therefore in a preferred embodiment the method of or system for providing information further comprises the step of or means for: establishing a communications connection between the interactive information device and at least one of, and preferably each of, the further information display devices. This enables information, data, etc. to be transferred between the devices without the aid of a mobile communications device.

Preferably at least some, and more preferably all, or substantially all, of the further information devices are connected together.

Preferably therefore the method of or system for providing information further comprises the step of or means for establishing a communications connection between each of the further information display devices and at least one of the other further information display devices, and preferably all of the further information devices.

In this manner, data, information, etc., can be transferred to each of the information devices in the network.

The information devices can be connected together for communication in any suitable manner. In a preferred embodiment the devices are connected together by one or more wireless connections. More preferably they are connected together via cables or other suitable communications means (e.g. fibre optic links, Ethernet cables, etc.).

Preferably therefore the step of establishing a communications connection comprises connecting the devices via cables or other suitable communications links. Wired connections between the information devices are particularly preferred because they are less prone to interference, they are generally more secure and generally provide greater rates of data transfer etc.

Although it is preferable for the information devices to be connected together by cables, wires or the like, they can instead be connected together by wireless means (or some may be connected by wired means and some by wireless means). Furthermore, connection between the interactive information device and a mobile communications device could also be wired or via other suitable physical means, for example by having a docking port on the interactive information device for receiving a corresponding connector of the mobile communications device.

However, such physical connection between the interactive information device and the mobile communications device may not be desirable, since such connections are generally proprietary for each model and/or manufacturer of mobile communications devices and in some embodiments, a cable is required to establish the connection, which the user of the mobile communications device is unlikely to carry with them.

Therefore it is preferable for the connection between the interactive information device and a mobile communications device to be wireless.

Therefore in a preferred embodiment the step of establishing a communications connection comprises establishing a short-range wireless connection, such as a Bluetooth connection, an infrared connection, a Wi-Fi connection, a Wibree connection, or the like.

As set out in the above embodiments, particular information can be selected and displayed on a display screen of the interactive information device. As further set out, it may be desirable for that same information and/or related information to be displayed on one or more of the further information devices. This can be achieved in a number of ways, some of which are set out above.

In a further or additional preferred embodiment the method of or system for providing information further comprises the step of or means for:

in response to an instruction from at least one of the interactive information device and the mobile communications device, transmitting to at least one of the further information display devices at least one of:

the particular information displayed on the interactive information device; and data related to the particular information displayed, and preferably transmitting both.

As set out above, this can be achieved by transmitting the information and/or data via the mobile communications device.

In a further or additional preferred embodiment this can be achieved by transmitting the information and/or data via one or more of the communications connections between the interactive information device and the further information device(s), e.g. preferably by sending the information and/or data via the wired links. This is advantageous because the data can be displayed on any one of the further information devices by controlling the interactive information device.

For example the "main" interactive information device can be a master device that controls one or more further slave information devices. This is particularly advantageous where at least one, some or all of the further information devices might be "dumb" terminals that either do not have input means for inputting data, commands for selecting information, etc. and/or do not have communications means for communicating with any devices other than the interactive information device. For example the dumb terminals may not have the capability to interact with a mobile communications device. Such dumb terminals are advantageous in systems in which it is, for example, desirable to have reduced complexity and/or costs.

Of course, this embodiment is equally applicable to systems in which at least one, some or all of the further information devices are not dumb, i.e. have some other form of communication and/or input.

The information and/or data sent to the further information device may contain all the data necessary to reproduce the information to be displayed on the further information device.

However this may require a significant portion of the available bandwidth for such transmissions, particularly in the case of large documents, images or other media. In, for example, a large system over which many transmissions are made, often at least partially consecutively, this may not be desirable.

In a preferred embodiment, the method of or system for providing information further comprises the steps of or means for:

storing in a memory of the further information display device at least a portion of the data stored in the memory of the interactive information device;

in response to receiving the particular information displayed on the interactive information device, displaying the particular information on the further information display device; and in response to receiving data related to the particular information displayed, displaying the received data on the further information display device and/or retrieving from the memory device of the further information display device the particular information and displaying the particular information on the further information display device.

Therefore in a preferred embodiment, if the further information device already contains some of the data and/or information it is desired to display, this information and/or data can be retrieved from a memory of the further information device instead of being transmitted to the further information device. This embodiment is similar to the embodiments discussed above in relation to transmitting partial data (e.g. transmitting pointers, bookmarks etc.) and the above discussion is equally applicable for use with this embodiment.

As discussed in the present application, information either previously selected for viewing and/or related to information previously viewed can be repeatedly viewed on one or more further information devices in a manner of ways.

However the embodiments of the present invention are not restricted to displaying only the above described information and/or data and in a particularly preferred embodiment the information displayed to the user on any of the further information devices (and/or indeed on the one or more interactive information devices) can be modified, reduced and/or enhanced in some way.

This is particularly advantageous in the present embodiment in which an interactive information device is coupled, e.g., by cables or the like, to further information devices which are also connected to each other, although of course this preferred method could equally be applied in any of the aforementioned embodiments as appropriate and the following description is intended to also be applicable thereto.

In a preferred embodiment therefore the method of or system for providing information further comprises the step of or means for: modifying, reducing and/or enhancing the information in response to at least one control parameter prior to displaying the information on the further information display device.

In a particularly preferred embodiment, the control parameter comprises any, some or all of:

location-based information, time of day information, day of week information, user preference, past user selections and/or navigations, user bookmarks, etc., although other parameters etc., for example as are known in the art can also or instead be used.

This arrangement is particularly advantageous because the information displayed on any of the information devices can be customised based on, for example, preferences of the user, which are determined, for example, in response to the interaction between the mobile communications device and the interactive information device (and possibly interactions between the mobile communications device and any one or more of the further information devices).

Furthermore the way in which the information is displayed can be specifically configured for the user. For example when the information is displayed, how much is displayed, what options, information, data, are presented to the user, etc. can be chosen based on for example the user's preferences, the time of day or the day(s) of the week that they usually interact with the interactive information device and/or the further information devices, the type of information that they use most frequently, etc.

Another control parameter comprises information such as where the user and/or the information devices are located. The master interactive information device can control the slave further information devices, even if these information devices are dumb terminals, to display customised information to the user as and when the user requires such information, by controlling the interactive information device (either via its input(s) and/or via the mobile communications device and/or automatically based on the user's preferences, location etc.) such that it controls one or more of the further information devices as, when and where appropriate.

In a preferred embodiment therefore the method of or means for providing information further comprises the steps of or means for:

determining user information and preference data in response to interactions between the mobile communications device and the interactive information device and/or any of the further information display devices; and using the user information and preference data as at least one of the control parameters for modifying, reducing and/or enhancing the information prior to display.

Display of the information on the further information devices can occur automatically in response to a request to do so from the interactive information device and/or from the mobile communications device.

Additionally or alternatively, an input means may be provided at the further information device to cause the device to display the information.

Preferably therefore the method of or system for providing information further comprises the steps of or means for:

providing a user input on at least one of the further information display devices; and in response to user operation of the input, selecting and displaying information on the display screen of the interactive information device and/or on the, and/or on any one of, the further information display devices.

In accordance with a further broad aspect of the present invention, there is provided a method of or system for providing information on an interactive information device, the method or system comprising steps of or means for:

storing in a memory of the interactive information device data comprising information selectable for display;

selecting particular information from the data stored in the memory;

displaying on a display screen of the interactive information device the particular information selected;

establishing a communications connection between the interactive information device and a mobile communications device, the mobile communications device comprising a memory;

transmitting data to the interactive information device from the mobile communications device and/or from the interactive information device to the mobile communications device;

establishing communications connections between the interactive information device and a plurality of further information display devices; and causing information to be displayed on at least one of the further information devices.

Preferably, as set out above, the interactive information device is a master device for controlling each of the slave further information devices and selected and/or enhanced or otherwise modified or configured information is displayed on one or more of the slave devices by control from the master device.

In particularly preferred embodiments, different information is displayed on different ones of the slave devices, preferably based on a user profile or the like.

As discussed above, the further information devices may be dumb terminals intended to display what they are instructed to display by the interactive information device. However, one or more of the further information devices may have means for enabling further devices, particularly though not exclusively mobile communications devices, to interact therewith. The further information devices may also have input means thereon for direct user interaction therewith.

In a preferred embodiment of the method of or system for providing information comprises the steps of or means for:

determining user information and preference data in response to interactions between the mobile communications device and the interactive information device, the user information comprising identification data identifying the particular mobile communications device;

storing the user information and preference data in the memory of the interactive information device; and transmitting to at least one of the further information display devices and storing in a memory thereof the user information and preference data.

Therefore the further information device not only contains means for configuring the information and/or data to be displayed to the user, but also contains means, i.e. the identification data, for identifying the particular mobile communications device of interest.

Preferably the information and preference data further comprises any, some, or all, of:

the number of selections made by the mobile communications device;

the type of selections made by the mobile communications device;

the frequency and/or speed of the selections made by the mobile communications device;

the type and/or amount of particular information selected for display by the mobile communications device; and the time of day and/or the day of the week of the interaction between the mobile communications device and the interactive information device.

Therefore in the embodiment where at least one of the further information devices is not a dumb terminal, and where the preference data and the information identifying the particular mobile communications device are stored in the further communications device, then any interaction between the mobile communications device and the further information device can be customised based on the relevant preference data when the further information device identifies the particular mobile communications device.

For example, in a preferred embodiment, the method of or system for providing information further comprises the steps of or means for:

detecting the presence of a mobile communications device within the communications range of at least one of the further information display devices;

when the presence of a mobile communications device is detected, comparing the identification data stored in the memory of the further information display device with identification data transmitted by the present mobile communications device; and if the identification data are coincident, identifying the present mobile communications device as the particular mobile communications device.

This advantageous arrangement allows the further information device to detect when a mobile communications device, and therefore the user carrying the mobile communications device, is near to the further information device, and customised information can be displayed to the user based on the preference data that the further information device has been sent by the interactive information device.

Therefore in a preferred embodiment the method of or system for providing information further comprises the step of or means for: displaying appropriate information on the further information display device in response to identification of the present mobile communications device as the particular mobile communications device.

If the further information device has any, some, or all of the functions of an interactive information device, e.g. if the further information device is browseable for further information in the manner set forth in any of the aforementioned embodiments, then the information presented to the user for browsing, selection and/or display can be customised based on the user profile stored in the further information device.

Preferably the user profile stored in the further information device is updatable based on the interactions of the mobile communications device with the further information device. Furthermore the updated user profile is preferably transmitted from the further information device to the interactive information device (for storage therein and/or for transmission therefrom to further information devices) and/or to further information devices, such that the most up-to-date user profile is used by each information device.

As discussed above, the further information device displays appropriate information when the presence of a particular mobile communications device is detected in the vicinity of the further information device.

In a preferred embodiment, the appropriate information comprises the particular information displayed on the display screen of the interactive information device. Thus the user is presented with the same information they previously requested as they approach the further information device.

This is advantageous in that the user can refer again to the information if they so wish, and/or the information can be automatically displayed to another party (e.g. a shop assistant in a shopping mall).

This can be achieved if desired without it being necessary for any information to be stored on the mobile communications device in the embodiments where the information is transmitted to the further information device via a communication connection with the interactive information device.

Alternatively or additionally the appropriate information displayed is a modified, reduced and/or enhanced version of the particular information displayed on the display screen of the interactive information device.

Therefore in a preferred embodiment, the method of or system for providing information as further comprises the step of or means for:

displaying on the interactive information display device and/or on the further information display devices, modified, reduced and/or enhanced information wherein the step of or means for displaying the appropriate information further comprises:

modifying, reducing and/or enhancing the appropriate information based on the user information and preference data stored in the further information display device; and displaying the modified, reduced and/or enhanced information on the interactive information display device and/or on the further information display device.

As set out above, the information displayed to the user when in proximity with a further information device is preferably customised based on a profile of the user.

In addition to the abovementioned profile data, and/or any other user data that may be determined by any suitable means in the art, in a preferred embodiment, the method of or system for providing information further comprises the steps of or means for:

determining the geographical location of the mobile communications device;

storing the geographical location of the mobile communications device as at least part of the user information;

further determining the geographical location of the mobile communications device when the device is relocated; and updating the stored geographical location of the mobile communications device.

In this manner the position of the mobile communications device can be used to at least partially determine what information is presented to the user as the user approaches a further information device.

In a particularly preferred embodiment, the step of or means for displaying the appropriate information further comprises the steps of or means for:

modifying or further modifying, reducing or further reducing and/or enhancing or further enhancing the appropriate information based any one of:

the present geographical location of the mobile communications device;

at least one previous location of the mobile communications device;

a series of geographical locations of the mobile communications device; and a chronological history of the geographical locations of the mobile communications device.

This arrangement is particularly advantageous because the interactive information display device and the further information devices can be used to determine: where the user is presently located (in the shopping mall example, this is useful as, for example, the information displayed to the user can be customised based on the products the user prefers and the shops near to the user that sells those products), where the user has been (in the shopping mall example, this is useful as, for example, because the system can determine which shops the user has been to, preferably how long the user spent in each area, and the information displayed to the user can be customised based on the shops the user visited and/or in which the user spent the greatest length of time), and/or the number of locations where the user has been and in what order the user visited those locations (in the shopping mall example, this is useful as, for example, the information presented to the user can be configured based on the route the user has taken so, for example, the shops that the user is approaching and that the user might wish to visit according to the profile could be displayed, etc.).

Preferably the means for determining the location of the mobile communications device comprises one or more GPS devices, and more preferably the GPS devices are used in conjunction with means for estimating the location of the mobile communications device based on the detection of one or more wireless communications systems. For example, greater precision of position can be attained using the aforementioned known wireless technologies, such as Bluetooth, Wi-Fi, etc.

In addition to, or as an alternative to, the user profile being used to configure the information that is displayed, the user profile information can be used by any of the information devices to configure the interaction between the mobile communications device and the information device.

For example, as a user approaches an information device and is presented with customised information, the user may wish to further select data therefrom and the user profile may be used to determine what options are readily presented to the user. For example, if the user typically navigates using visual indicators (e.g. if the user likes to select, e.g., the products to be viewed by selecting an image of the type of product) then the data presented to the user preferably comprises appropriate visual indicators.

If however the user prefers to navigate using text-based searches, the user is instead presented, for example, with a virtual keyboard, perhaps some keywords that the user typically uses, etc.

Furthermore, options that the user generally does not use may be prevented from being displayed in order to present an uncluttered display with which the user can readily and rapidly interact. This arrangement is particularly preferred when the information device has an input means such as a touch-sensitive display or the like, since the most appropriate options for selection can be located at the most appropriate touch-sensitive regions, for example.

The above embodiments are directed to the interaction of a mobile communications with an interactive information device and preferably with one or more further information devices, the further information devices typically at least comprising a display and means for communicating with either the interactive information device or the mobile communications device.

However in some embodiments of the invention, it is not necessary for the further information devices to comprise a display and, for example, any information stored at the further information devices may be configured to be transmitted to other devices for display.

Furthermore the further information devices in these embodiments need only have means for communicating with, for example, a single device, which need not necessarily be the interactive information device.

Preferably such further information devices are placed at a location remote from the interactive information device.

In a such preferred embodiment the method of or system for providing information further comprises the step of or means for: providing at least one device having data stored in a memory thereof and, in one preferred embodiment, these devices have no direct means of communication with the interactive information device. They preferably also or instead do not themselves have a display.

These arrangements would allow the use of devices that can be simple, small and have a low power consumption and so are relatively low cost. In preferred embodiments a large number of such, preferably "remote", more limited devices can be and preferably are employed for any suitable purpose, for example, such devices could be used as information "tags" that can be associated with a particular product, service or the like and can store information regarding that product or service in the memory thereof.

Preferably such more limited information tag devices function as data storage devices containing any desired information and in a particularly preferred embodiment are capable of transmitting that data at least to a mobile communications device that comes within communication range of the tag device.

Therefore in a preferred embodiment, the method of or system for providing information further comprises the steps of or means for:

detecting the presence of a mobile communications device within the communications range of an information device; and transmitting data to the detected mobile communications device in response to detection thereof.

Therefore data from such a more limited information tag device can be sent to, and preferably stored on, a mobile communications device when the mobile communications device approaches the tag device. This arrangement has many useful applications such as, for example, as a navigation aid (as a user passes successive such tag devices for example they can be given directions to the next tag device), or as an information tool, such as for example to inform a user of a mobile communications device of the operating times of a service, the opening times of a shop, restaurant, etc., the services available from a particular source, etc.

In a preferred embodiment, the step of or means for transmitting data to the mobile communications device further comprises steps of or means for:

associating the tag device with a product, service and/or other means; and transmitting data to the detected mobile communications device, wherein the transmitted data comprises information relating to the product, service and/or other means with which the tag device is associated.

Preferably the method or system further comprises including in the transmitted data at least an indication of the product, service and/or other means. This arrangement is particularly advantageous because a user can discover more information about a product, service and/or means simply by approaching the product, service and/or means and reviewing the data sent to their mobile communications device by the associated information tag device.

In particularly preferred embodiments, the tag devices are small and preferably configured such that they can be readily concealed and/or are unobtrusive in use. For example, in the product tag embodiment, where for example the product is, say, clothing, the tag is preferably sufficiently small and unobtrusive such that it can be associated with the clothing without preventing the clothing from being worn, or from hanging correctly, etc.

Although the above embodiments may provide information to a mobile communications device, as set out previously, the memory capacity of such mobile communications devices can be somewhat limited and furthermore the size and resolution of a typical mobile communications device display may not be suited to displaying a large amount of data, or complex data, or data such as images and video or the like.

Therefore in a particularly preferred embodiment, the data sent to the mobile communications device by the more limited tag device is transmitted from the mobile communications device to the interactive information device for display. In this manner, the information stored on the perhaps "remote" tag device can be viewed on the interactive information device without the "remote" tag device communicating directly with the interactive information device. Therefore the power consumption of the "remote" tag device can be minimised as only very short-range communication is needed between the "remote" tag device and the mobile communications device.

This is further advantageous because, in arrangements in which several more limited tag devices are located in close proximity to each other, if they were each required to communicate directly with the interactive information device then they might interfere with each others' communication with the interactive information device.

Still further, in this embodiment, data is only transmitted to the interactive information device and displayed thereon when a user carrying the mobile communications device approaches the more limited tag device and therefore the information displayed on the interactive information device is selected according to the preference of the user.

This embodiment is particularly useful for the shopping mall example, since, for example, a more limited information tag device could be associated with each item and/or type of clothing and as the user approaches the item, information relating thereto, such as price, available colours and sizes, other clothing and/or accessories suitable to wear with that item, etc., could be displayed on the interactive information device.

As set out above, the information to be sent to the mobile communications device from the more limited tag device, and preferably to be further transmitted to the interactive information device, may be the information that is to be displayed to the user via the mobile communications device and/or the interactive information device.

It is believed that such an arrangement for transmitting information to an information device, preferably an interactive information device, may be new and advantageous in its own right.

Therefore in accordance with a further broad aspect of the present invention there is provided a method of providing information using an information device, the method comprising:

a tag device detecting the presence of a mobile communications device;

transmitting data stored in the tag device to the mobile communications device in response to the detection;

transmitting at least some of the data, received from the tag device, from the mobile communications device to an information device; and displaying on a display of the information device information relating to the transmitted data received from the mobile communications device.

Preferably the information device comprises an interactive information device, for example a touch-screen display as discussed in relation to previous embodiments. This is advantageous because, for example, this enables the person that possesses the mobile communications device to interact with the information displayed on the information device.

In accordance with another broad aspect of the present invention there is provided a system for providing information using an information device, the system comprising:

an information device; and a tag device comprising:

means for detecting the presence of a mobile communications device; and means for transmitting data stored in the tag device to the mobile communications device in response to the detection;

the information device comprising:

means for receiving from the mobile communications device at least some of the data transmitted by the tag device to the mobile communications device; and a display for displaying information relating to the data received from the mobile communications device.

As above, it is particularly preferred that the information device comprises an interactive information device in accordance with the various disclosures of the present application.

In a preferred embodiment, the system further comprises a mobile communications device comprising means for receiving data from the tag device and means for transmitting at least some of the data to the (interactive) information device.

The above preferred features disclosed in relation to all the aspects and embodiments of the present invention are also intended to be applicable to these further broad aspects of the present invention, where appropriate and compatible.

Although the information to be sent to the mobile communications device from the more limited tag device, and preferably in some aspects and embodiments to be further transmitted to the interactive information device, may be the information that is to be displayed to the user via the mobile communications device and/or the interactive information device, in some embodiments it is preferred that the more limited information tag devices are as compact as possible, and have low power consumption. One way to achieve these requirements is for the more limited tag device, like the mobile communications device, to have a relatively low capacity memory.

Therefore in some preferred embodiments the amount of data stored on the more limited information tag device may be limited.

Therefore in a preferred embodiment the step of or means for transmitting data to the detected mobile communications device from the more limited information tag device preferably comprises the more limited tag device preferably transmitting only some form of identifier for the data that is to be displayed, rather than the data itself. Most preferably it further comprises steps of or means for:

configuring the data to be automatically transmitted from the mobile communications device to the interactive information device; and configuring the data to cause selection of the particular information to be displayed from the memory of the interactive information device and to cause display of the particular information on the display screen of the interactive information device, the particular information comprising further details relating to the product, service and/or means with which the more limited tag device is associated.

Therefore if the more limited tag device has limited memory, further information, and indeed related or otherwise associated information, can be retrieved as appropriate from the memory of the interactive information device to supplement the information provided to the user.

In the above embodiments of the more limited information tag device arrangement, the more limited information tag device does not communicate with the interactive information device directly. Although this has many advantages as set out above, it also means that the more limited information tag device is reliant upon communication via the mobile communications device.

Thus, in another preferred embodiment, data can be communicated directly from the more limited tag information device to the interactive information device. This may be advantageous in some environments. Such communication could be as well as communication between the more limited information tag devices and the mobile communications device, but preferably is instead of the more limited information tag device transmitting the information to the mobile communications device.

In such an arrangement, the step of or means for establishing a communications connection between the interactive information device and the mobile communications device would then comprise:

establishing a connection between the mobile communications device and an intermediate device (the more limited information tag device); and establishing a connection between the intermediate device and the interactive information device.

In this manner the mobile communications device would indirectly communicate with the interactive information device. This may be advantageous, for example, when the mobile communications device is located outside the communication range of the interactive information device but within the communication range of the more limited information tag device.

In a preferred embodiment, the step of or means for establishing communications further comprises steps of or means for:

the more limited information tag device detecting the presence of the mobile communications device within the communications range of the more limited information device;

in response to the detection, establishing communications with both the detected mobile communications device and the interactive information device; and the method of or means for providing information further comprising the step of or means for transmitting data from the more limited information tag device to the interactive information device.

Therefore when the mobile communications device approaches a more limited information tag device, information is transmitted from that tag device to the interactive information device once the presence of the mobile communications device is detected by the more limited information tag device.

The more limited information tag device can detect the presence of the mobile communications device in any suitable manner. Preferably the tag device continuously scans for the presence of mobile communications devices in proximity to the tag. Once the presence of a mobile communications device is detected, for example by the tag device receiving data that is automatically transmitted or broadcast from the mobile communications device, the more limited information tag device preferably transmits this detection to the interactive information device. Preferably the tag also sends an identifier associated with the more limited information tag device to the interactive information device, as well as preferably also a mobile communications device identifier (which, e.g., may be received as part of the automatic transmission from the mobile communications device).

In the above example, it is not necessary for full, bi-directional communications to be established between the more limited information tag device and the mobile communications device, since the more limited information tag device can identify and use the identifier, etc., information that is broadcast by the mobile communications device in normal operation, without the need to establish a bi-directional communications link for this purpose. In other words the more limited information tag device can simply receive the automatic transmission from the mobile communications device without requiring full communication with the mobile communications device since it is not necessary in all embodiments for data to be sent in the other direction, i.e. from the tag to the mobile communications device. This can be advantageous because the detection and transmission of the identifier data to the interactive information device can therefore be rapid, as it is not delayed by waiting for a bi-directional communications connection to first be established between the more limited information tag device and the mobile communications device.

Preferably the connection between the more limited information tag device and the interactive information device is high-speed and is not subject to interference with or from the interaction between the mobile communications device and the more limited information tag device.

Preferably therefore a wired connection is provided between the more limited information tag device and the interactive information device. However it may be more desirable that the more limited information tag device is substantially free of wires or cables, and in this embodiment the more limited information tag device preferably communicates with the interactive information device wirelessly, preferably using a different channel and/or frequency to any interaction or communications channel that may exist between the mobile communications device and the tag device.

As set out above, the more limited information tag device is preferably associated with a service, product or other means, and information relating to the service, product or other means with which the more limited information tag device is associated, most preferably at least an indication of the product, service and/or other means, is transmitted to the interactive information device.

Furthermore in a preferred embodiment the step of or means for transmitting data to the detected mobile communications device further comprises steps of or means for:

configuring the data to be automatically transmitted from the intermediate device to the interactive information device in response to detection of the mobile communications device; and configuring the data to cause the selection and display of the particular information on the display screen of the interactive information device, the particular information comprising further details relating to the product, service and/or means with which the tag device is associated.

The above arrangement of the tag device communicating information stored thereon to an information device, preferably an interactive information device in accordance with any of the above embodiments, when the tag device detects the presence of a mobile communications device is thought to be advantageous and new in its own right.

Therefore in accordance with a further broad aspect of the present invention, there is provided a method of providing information using an information device, the method comprising:

a tag device detecting the presence of a mobile communications device;

transmitting data stored in the tag device to an information device in response to the detection; and displaying on a display of the information device information relating to the transmitted data received from the tag device.

Preferably the information device comprises an interactive information device, for example a touch-screen display as discussed in relation to previous embodiments. This is advantageous because, for example, this enables the person that possesses the mobile communications device to interact with the information displayed on the information device.

The information can be displayed on the information device, for example, automatically in response to detection of the presence of a mobile communications device and transmission of data to the information device. However in some embodiments, the information is not displayed on the information device until a certain event or action occurs. For example, the information may be displayed based on a timed event, for example after a predetermined length of time has elapsed. Alternatively or additionally, the information may be displayed, for example, upon a request from the mobile communications device and/or in response to, for example, detection by the information device of the presence of the mobile communications device in close proximity with the information device. This is particularly advantageous because, for example, the information can be displayed to the user of the mobile communications device only when the user is sufficiently close to the information device to be able to view the information that is displayed. In a preferred embodiment, data can be transmitted from more than one tag to the information device and the information relating to the data from each tag can, for example, be offered for display on the information device concurrently, consecutively, on demand, etc.

As discussed above, in a particularly preferred embodiment identifier data identifying the mobile communications device can be sent from the tag to the information device. This is particularly advantageous in one of the present embodiments, wherein the information device displays the information when the presence of the mobile communications device in the vicinity of the information device is detected, because the identifier can be used, for example, to identify the particular mobile communications device, as well as, or alternatively, for configuring the information displayed, based, for example, on the user's preferences etc. as set out in the present application.

In accordance with a still further broad aspect of the present invention, there is provided a system for providing information using an information device, the system comprising:

an information device;

a tag device comprising means for detecting the presence of a mobile communications device;

means for transmitting data stored in the tag device to an information device in response to detection by the detection means; and means for displaying on the display of the information device information relating to the transmitted data received from the tag device.

Preferably the information device comprises an interactive information device as set out in relation to the aspects and embodiments of the present invention disclosed in the present application. Preferably information is displayed on an information/interactive information device, in response to a predetermined event or occurrence, as discussed above. For example in a particularly preferred embodiment, information is displayed on the information/interactive information device in response to detection of the presence of a mobile communications device in the vicinity of the information/interactive information device, as discussed above in relation to the previous aspects and embodiments.

The above preferred features disclosed in relation to all the aspects and embodiments of the present invention are also intended to be applicable to these further broad aspects of the present invention, where appropriate and compatible.

In all of the above aspects and embodiments, references to communications connections between devices are intended to cover known communications connections and, for example, references to wireless and/or short-range wireless connections include any suitable connections for transmission of data etc. as discussed above. Furthermore in any of the above systems or methods, it should be noted that any devices may communicate using a particular protocol and it is not necessary for other communications in the same method or system to communicate using the same protocol. For example, a mobile communications device may wirelessly connect to an information device using, for example, a Wi-Fi protocol, and a remote device may connect wirelessly to the mobile communications device using a different protocol, e.g. Bluetooth.

Still further, references to data, information, etc., being stored in a memory of a device are not intended to be limiting to a memory that is an integral part of the device. For example, references to a memory of a device, or storage of data/information in a device, etc., are intended to cover memory means that are a part of, and/or are associated with, the device in any appropriate manner. For example, a memory may be external to a particular device and may have a, for example, wired or wireless connection to the particular device. The memory may, for example, comprises a server, that can, for example, be remote from the device that accesses data and/or information stored on the server, etc.

Still further, references to data stored in memory and/or device are intended, in preferred embodiments at least, to further comprise the step of storing the data in the memory and/or device as appropriate. For example, in the first broad aspect of the present invention, in a preferred embodiment the method further comprises the step of storing data in a memory of or accessible to the interactive information device. Of course, this step of storing may additionally or alternatively apply to any data, information, etc. referred to as stored in the present application, as appropriate.

Furthermore references to the user interacting with the interactive information device and/or with the further information devices, where such interaction comprises; for example, selecting data via a touch-sensitive display, are not intended to be limiting and other such selections can be made in any other known manner such as by voice interaction, via a remote control device or the like. It is particular preferred that selection of data on the interactive display device, e.g. browsing menus, selecting options etc., or indeed any other form of interaction with the interactive information device, could be, and indeed preferably is, carried out by using the mobile communications device as a remote browsing device, the selections etc., being made of the communications channel established therebetween.

As will be appreciated by those skilled in the art, all of the aspects and embodiments of the invention described herein can and preferably do include any one or more or all of the preferred and optional features of the invention described herein, as appropriate.

The methods in accordance with the present invention may be implemented at least partially using software, e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system.

The invention also extends to a computer software carrier comprising such software which when used to operate a personal communications system or hands free device comprising data processing means causes in conjunction with said data processing means said system or device to carry out the steps of a method or of the method of the present invention.

Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As will be appreciated by those skilled in the art, these aspects and embodiments of the invention can, and preferably do, include any one or more or all of the preferred and optional features of the invention described herein, as appropriate. Thus for example any preferred or optional feature described herein can be, and preferably is, combined with any, some or all of the above-described embodiments of the method of providing information and/or of the interactive information system.

A number of preferred embodiments of the present invention will now be described by way of example only and with reference to the accompanying drawings, in which:

FIGS. 1(a) to 1(e) show schematically a method of providing information on an interactive information device in accordance with embodiments of the present invention;

FIG. 2 shows schematically a method of controlling an interactive information device using a mobile communications device in accordance with embodiments of the present invention;

FIG. 3 shows schematically another method of controlling a plurality of information devices using a mobile communications device in accordance with embodiments of the present invention;

Figure 4:
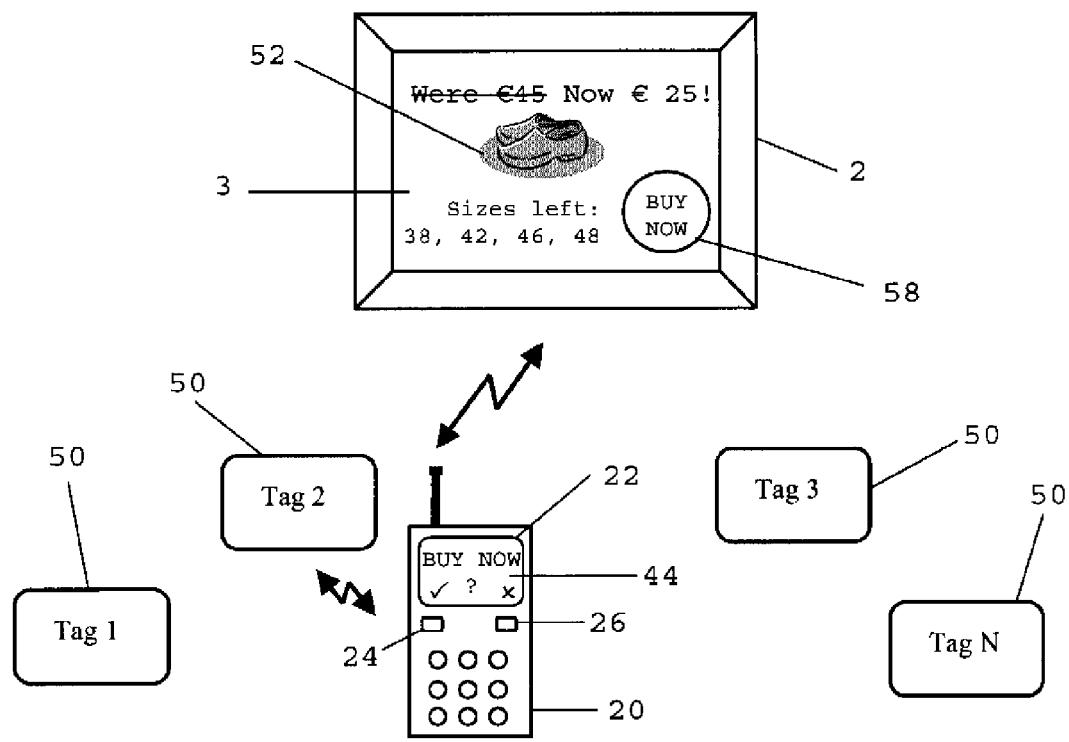
Figure 5:
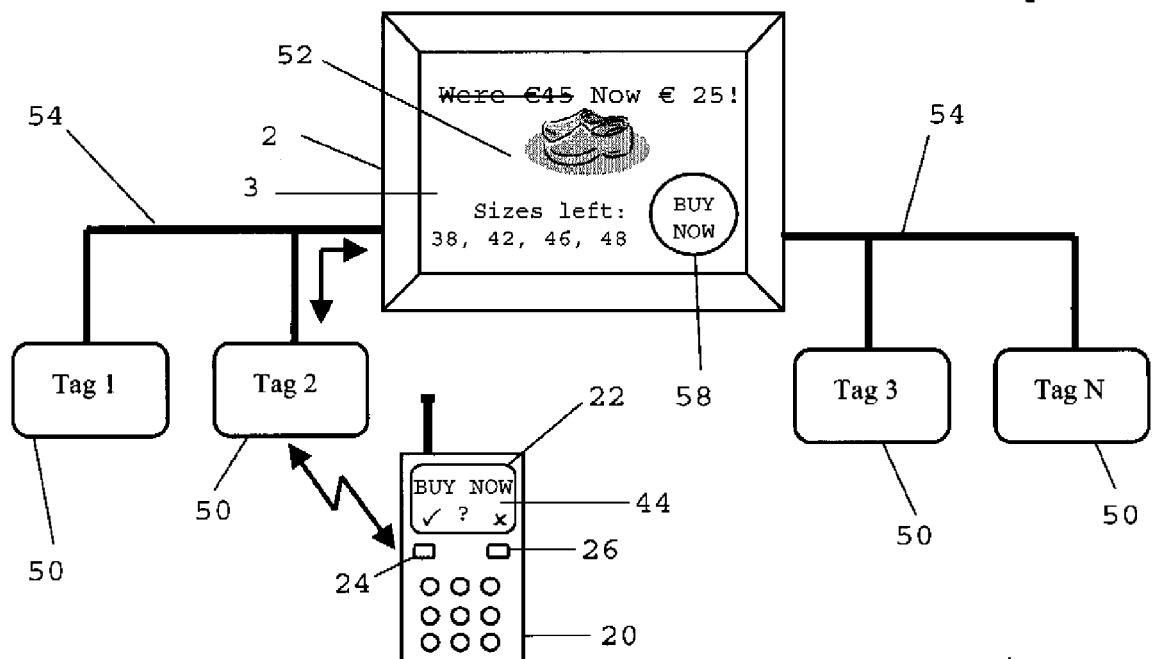

FIG. 4 shows schematically a system by which information devices interact with a mobile communications device to provide information on an interactive information device in accordance with embodiments of the present invention; and FIG. 5 shows schematically a similar system to the FIG. 4 system, which operates in an alternative manner and by which information devices interact with a mobile communications device to provide information on an interactive information device in accordance with embodiments of the present invention.

FIGS. 1(a) to 1(e) show schematically a method of and a system for providing information on an interactive information device 2. The interactive information device 2 is an interactive information provider 2 that, in this particular example, is located in a shopping centre/mall/area or other similar commercial premises.

Figure 1A:
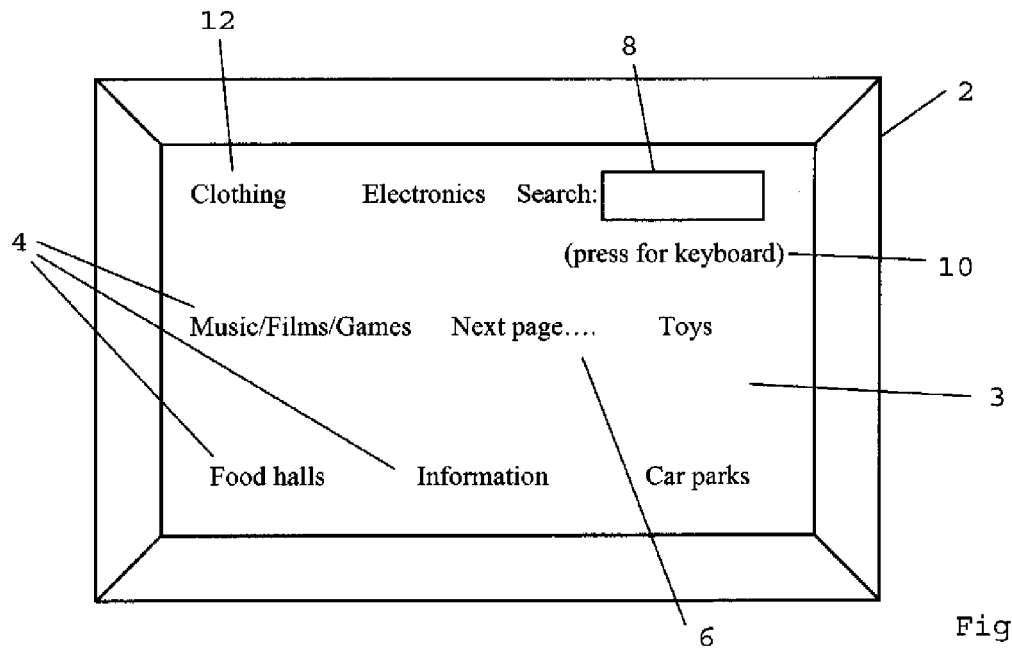
Figure 1B:
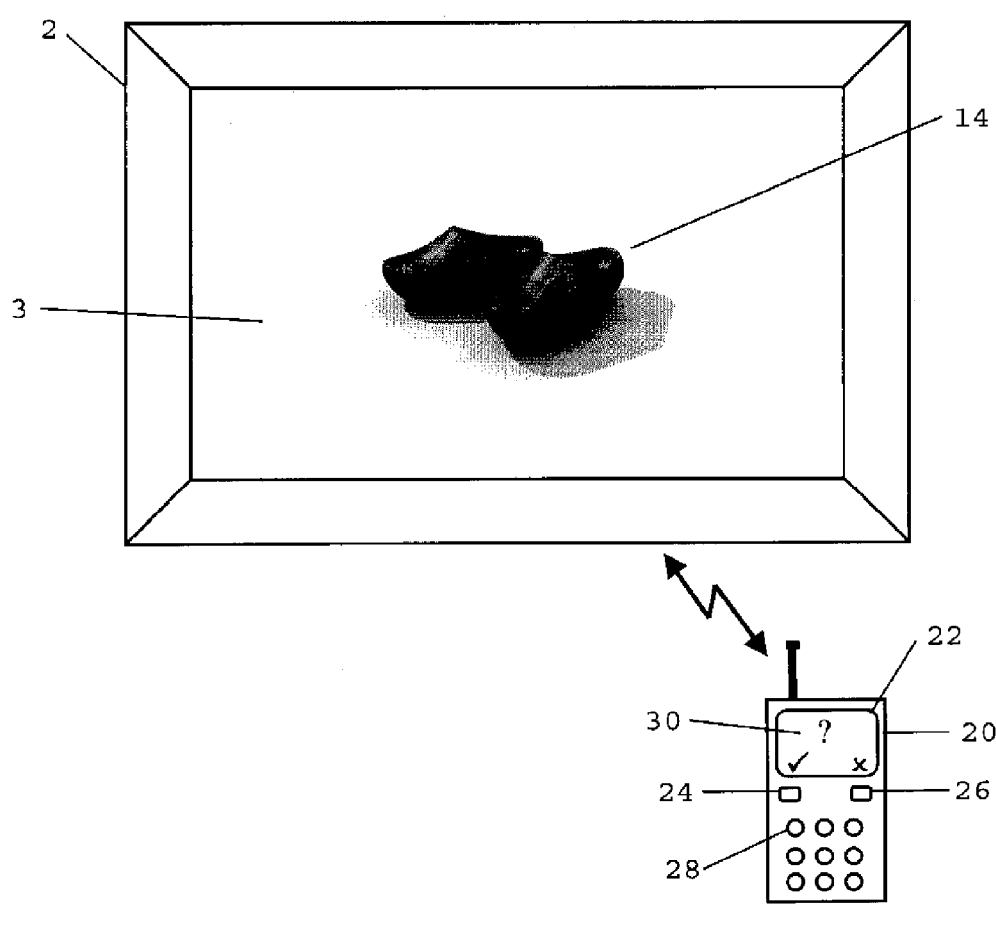

As can be seen in FIG. 1(a), the interactive information provider 2 has a screen 3, which in this embodiment is an interactive touch-activated screen 3, such as a plasma or LCD display. However it is envisaged that any other or alternative method of interaction with information 4 shown on the screen could be employed, for example voice interaction/speech recognition means, interaction via a remote device (which in certain preferred embodiments comprises a mobile communications device such as a mobile phone, PDA, BlackBerry device etc. as discussed below), interaction via an input device, such as keys on the interactive information provider 2 and/or provided on a separate keyboard, a mouse or trackball or other pointer, etc. associated with the interactive information provider 2, etc.

In a default mode in this embodiment, the screen 3 of the interactive information provider 2 has displayed thereon a number of different options 4, 6, 8, 10 that are available for selection. For example, in this embodiment the options that are selectable (by interaction with the screen 3 for example) comprise several different categories 4 of premises within the mall, an option 6 enabling further pages of options to be displayed on the screen 3, a keyword search input 8 and an associated input 10 for enabling a virtual keyboard to be displayed (not shown) on the screen 3 to enable input of keywords for searching for particular information, products, services, shops or the like.

When a user, e.g. a shopper, enters the shopping mall and wishes to purchase a particular product, the shopper is able to search for relevant information, such as which shops stock the particular product and/or where those shops are located, etc., by interacting with the interactive information provider 2 as follows.

If, for example, the shopper wishes to buy a pair of shoes, the shopper selects the appropriate category from those offered on the screen 3. In this example the user should select the clothing option 12.

If however the shopper, for example, cannot find an appropriate option, and/or if the shopper is unsure as to which category the required product falls within, an appropriate option may alternatively be searched for by viewing other screens (e.g. by activating the next page option 6), and/or by performing a keyword search for "shoes" (using, for example, the search input 8 and the virtual keyboard option 10).

When the shopper requests further information regarding clothing by activating the appropriate option 12, further appropriate sub-categories may be provided to the shopper for selection from the screen 3.

For example, in this embodiment the subsequent information displayed on the screen for selection could be categories of clothing such as tops (jackets, jumpers, shirts, t-shirts, blouses etc.), bottoms (trousers, skirts, shorts, etc.), footwear (boots, shoes, sandals, slippers, etc.), accessories, etc.

The shopper wishing to purchase a pair of shoes can then select the footwear option, followed by the shoes option, perhaps followed by a formal or informal/casual option, and then followed for example by a men's or women's articles option.

In this example the shopper wishes to purchase men's casual shoes and indicates in the manner set out above that further information is required in this category.

The interactive information provider 2 in response to this interaction with the shopper displays on the screen 3, for example, a map of the shopping mall showing the location of any shops selling men's casual shoes.

In preferred embodiments, whilst the shopper considers the information shown on the screen 3, the interactive information provider 2 further presents on the screen 3 an option asking if the shopper wishes to download the information shown. Furthermore, if there is additional information stored in the interactive information provider 2 relating to men's casual shoes, for example regarding the products sold by one (or more) of the shops, and/or promotional offers that one (or more) of the shops is currently running, etc., the shopper may also be offered this further information for download.

The interactive information provider 2 is capable of transmitting data to any of a wide range of different devices, for example to a mobile phone, a laptop, a PDA or other handheld personal device such as a BlackBerry unit, etc., using any appropriate communications technology, such as wireless communications (using any suitable protocol such as, for example, Bluetooth, infrared, Wi-Fi, Wibree, DVB-H/DBV-H (digital video broadcasting handheld), NFC, Zig-Bee, etc.) and/or physical connections such as for example a USB connection, an Ethernet connection, or other wired connections, or by docking the portable device onto an appropriate docking connection provided at the interactive information provider 2, etc.).

If the shopper owns any appropriate mobile communications device, e.g. in this embodiment the shopper is carrying a mobile phone 20 (as shown in FIGS. 1(b) to 1(e)) that has a Bluetooth module, and wishes to have the information offered by the interactive information provider 2 transmitted to their device 20, then the shopper must positively respond to the offer (e.g. by selecting a download option on the screen 3, and/or by enabling Bluetooth on the mobile phone 20, and/or by placing the mobile phone 20 within communications range of the interactive information provider 2 (which for Bluetooth for example may be short-range, such as for example a meter or less, or a few to about 10 meters for example).

In a particularly preferred embodiment of the invention, the interactive information provider 2 has associated therewith a "hot zone" which is indicated by, for example, an image of a phone or any other suitable indication of a zone where a mobile communications device 20 should be located to receive transmissions.

In a particularly preferred embodiment, the interactive information provider 2 displays an offer to the shopper on the screen 3 to send information regarding men's casual shoes from a particular shop to the shopper's mobile phone 20.

When the phone 20 is placed near to the interactive information provider 2 (i.e. within the transmission "hot spot") a message or prompt is automatically displayed on the display screen 22 of the shopper's mobile 20 phone asking if the download should be activated and, for example, informing the shopper that no charge will be made for the transmission (or this information may alternatively or additionally be provided on the screen 3 of the interactive information provider 2 for example).

If the shopper positively responds, i.e. indicates that they do wish to receive the information regarding men's casual shoes from a particular shop, the information is transmitted from the interactive information provider 2 to the mobile phone 20.

In addition to transmitting information, the interactive information provider 2 may also transmit any further data necessary for the mobile phone 20 to be able to use the information sent thereto. For example, the interactive information provider 2 in a preferred embodiment transmits an application that automatically executes on the mobile phone 20 to display the information requested by the shopper.

In a particularly preferred embodiment, the interaction between the mobile phone 20 and the interactive information provider 2 provides information to the interactive information provider 2 about the type of mobile phone 20. For example, the interactive information provider 2 can determine the particular manufacturer of the mobile phone 20 and/or the model of phone 20.

This enables the interactive information provider 2, in a particularly preferred embodiment, to configure the information and/or application data that is sent to the mobile phone 20 such that it is displayed and/or executed appropriately on the display 22 of the mobile phone 20 and/or by the phone 20.

In the embodiment shown in FIGS. 1(a) to 1(e), the information is configured to be sized appropriately and to contain a minimal amount of text. Furthermore any text that is displayed is adequately sized so as to be clear and readily readable.

Once the information and/or the application has been transmitted to the mobile phone 20 the shopper is able to browse through the information displayed on the display 22 of the phone 20, for example to look for a particular pair of shoes that they wish to try on, etc. If the shopper finds a pair of shoes that they wish to know more details about, they interact with the mobile phone 20 to request more information.

At this stage, the shopper has viewed all the information about the shoes that was sent to the mobile phone 20. This is because the interactive information provider 2 transmits only basic details to the phone 20 about the products that the shop of interest sells. This may be because (as is the case in this example) the interactive information provider 2 determined prior to transmitting the data that the mobile phone 20 has a small capacity memory, and therefore the interactive information provider 2 determines that only a small data packet should be transmitted to the mobile phone 20.

In alternative arrangements, the interactive information provider 2 is programmed to send only a limited amount of data to a mobile communications device by default, in order to avoid filling the memory of any mobile communications device that has only a small capacity. This can be achieved even without the need to determine the capacity of the memory of the device.

As there is no further information about the shoes that the shopper wishes to see stored in the mobile phone 20, the shopper is prompted to display any additional information on the interactive information provider 2. In the present embodiment, this is achieved by displaying a prompt 30 on the display 22 of the mobile phone 20 (as shown in FIG.

1(*b*)). In alternative embodiments, the prompt could be displayed additionally or alternatively on the screen 3 of the interactive information provider 2.

If the shopper positively responds to the prompt 30, in this embodiment by pressing the "yes" or "✓" key 24, the additional information 14 is displayed on the screen 3 of the interactive information provider 2 as shown in FIG. 1(*b*). This is particularly advantageous because large data files can be stored on the large capacity memory of the interactive information provider 2 and the additional information 14 can rapidly be displayed by retrieving the required data from the memory of the interactive information provider 2.

In this embodiment, a large picture 14 of the product of interest is therefore displayed on the screen 3 of the interactive information provider 2 and further information (not shown) can also be provided, such as for example, the price of the shoes, in the available colours of the shoes, etc. In this embodiment it would not be possible to clearly display all the information on the display 22 of the mobile phone 20 as the screen size and resolution of the display 22 are limited compared with the screen 3 of the interactive information provider 2.

When the shopper has finished browsing for products on the mobile phone 20 and/or on the interactive information provider 2, the shopper closes the application running on the mobile phone 20 in preparation for leaving. Alternatively the shopper may simply walk away from the interactive information provider 2, thereby removing the mobile phone 20 from the transmission area or "hot spot". Other means known in the art for determining that the interaction is to cease may of course be used instead of, or in addition to, the methods disclosed herein.

As soon as the interactive information provider 2 determines that the shopper is finishing/about to finish interacting with the interactive information provider 2, the shopper is prompted to make a final interaction with the interactive information provider 2.

In a particularly preferred embodiment, the prompt comprises a message that appears on the screen 3 of the interactive information provider 2 asking if the system is allowed to remember the shopper's preferences and/or asking the shopper if they wish to receive information associated with the product(s) that they have viewed. Of course, in other embodiments the prompt could, for example, be displayed on the screen 22 of the mobile phone 20, or could be displayed both on the mobile phone 20 and the interactive information provider 2.

If the shopper agrees to data regarding their interaction with the interactive information provider 2 being stored (for example by activating the "yes" key 24), then the interactive information provider 2 stores appropriate data in its memory.

The data can include any of the information discussed above and in this embodiment the data includes a list of the options selected by the shopper, the manufacturer and model of the shopper's mobile phone 20, and the last screen viewed by the shopper.

If the shopper agrees to receive information associated with the product that they viewed, the interactive information provider 2 transmits appropriate data (in an appropriate format) to the mobile phone 20 for storage in the memory of the mobile phone 20. The data may, for example, include a basic image of the product 16 (as shown in FIG. 1(*c*)), details of the product viewed, or simply may comprise a bookmark or pointer to the last screen viewed by the shopper, or any other appropriate information.

The shopper leaves the interactive information provider 2 and approaches the shop that sells the shoes of interest.

When the shopper arrives in the shop, he needs to explain to the shop assistant which shoes he wishes to try on. The shopper can do this by describing the shoes, but this may not enable the shop assistant to discern which of the many shoes they sell the shopper wishes to see. The shopper could try to convey the information to the shop assistant by showing the assistant the basic image of the shoes stored in the memory of the mobile phone 20. This is only possible if the shopper allowed the data to be transmitted to the phone 20 as they did in this embodiment.

However, a typical image, even a simplified/reduced one, can occupy a substantial proportion of a typical memory in a mobile phone or other portable device and therefore in some embodiments the shopper may not have allowed the image to be downloaded. Even if the shop assistant can view the basic image, it may not convey enough information to identify the particular shoes (particularly if, for example, the mobile phone 20 only has a small display 22).

In the present embodiment there is provided in the shop a point of sales device or terminal, which contains details of the shop's stock, current prices, promotions, etc., and also enables transactions to be carried out, e.g. purchases, returns and exchanges etc.

The point of sales terminal 18 (which is shown in FIG. 1(*d*)) also has a display 36 for displaying information regarding transactions, products, etc., and at least one communications module (preferably the point of sales terminal 18 has the same communications ability as the interactive information provider 2, so that the terminal 18 can communicate with as many different mobile communications devices in as many different manners as the interactive information provider 2).

In the present embodiment, the terminal 18 at least comprises a Bluetooth communication module so that it can communicate with the shopper's mobile phone 20 (although it is, of course, within the scope of the present invention for the terminal 18 to communication with the shopper's mobile phone 20 using a different technology and/or protocol to the technology and/or protocol that the interactive information provider 2 used to communicate with the mobile phone 20).

The shop assistant invites the shopper to approach the point of sales terminal 18 to bring the shopper's mobile phone 20 within the communications range of the terminal 18. In some embodiments, the interactive information provider 2 is capable of direct communications with the terminal 18 and after the shopper terminated interaction between the interactive information provider 2 and their mobile phone 20, the interactive information provider 2 automatically sent the stored preference data regarding the shopper's interaction with the interactive information provider 2 to the terminal 18. Alternatively this information could be sent to the terminal 18 only when the terminal 18 signals to the interactive information provider 2 that the mobile phone 20 is in the vicinity of the terminal 18.

Therefore as soon as the shopper approaches the terminal 18 and the terminal detects the presence of the mobile phone 20 (either by establishing a connection, e.g. a Bluetooth connection, with the phone 20 and/or by any other suitable means such as simply detecting the particular mobile phone 20 is near to the terminal without establishing a communications connection) the last information viewed by the shopper on the interactive information provider 2 is automatically displayed on the display screen 36 of the terminal 18, thereby enabling the shop assistant to identify the exact pair of shoes the shopper wishes to try on.

Figure 1E:
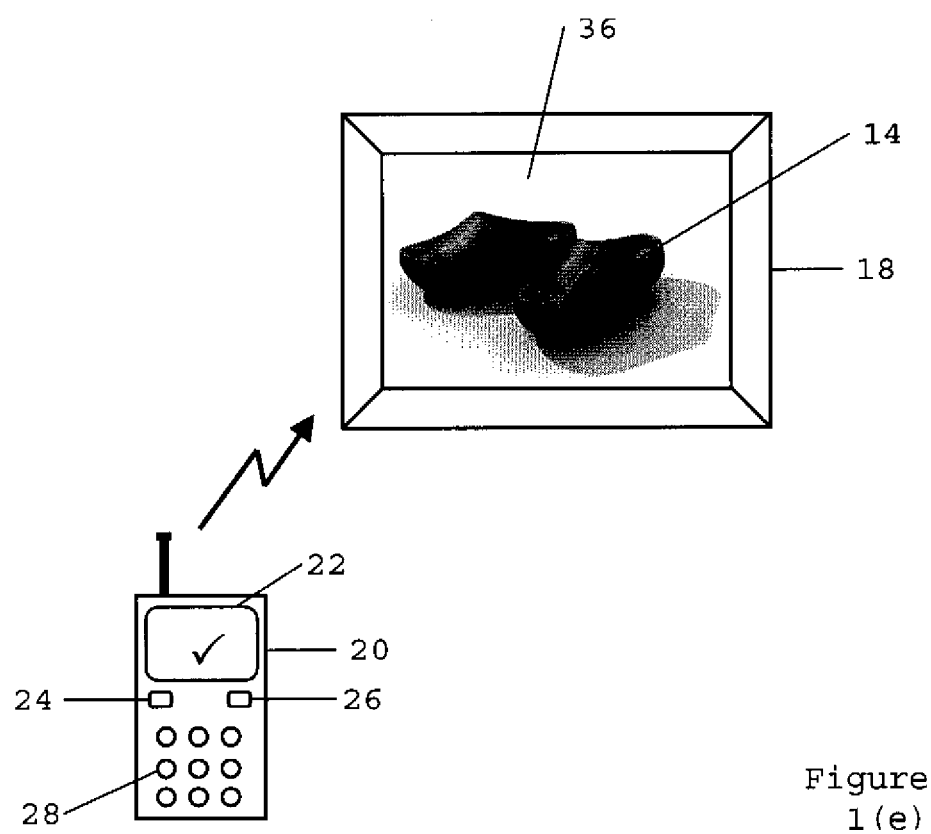

This is particularly advantageous because the user does not have to repeat all of the selection steps that they performed earlier with the interactive information provider 2 in order to view the product of interest since the navigation steps are not required. In alternative or additional embodiments, as shown in FIGS. 1*d* and 1*e*, the information to be displayed on the display screen 36 of the terminal 18 may be provided to the terminal 18 by the shopper's mobile phone 20.

In this embodiment it is not necessary for the terminal 18 to have any direct communications with the interactive information provider 2 (rather only indirect communication via the mobile phone 20 is needed). The shopper in this embodiment is prompted by a message 32 on the display 22 of the mobile phone 20 to allow transmission of data from the mobile phone 20 to the terminal 18 and, if the shopper agrees to the transmission (by pressing the key 24 associated with a positive response as shown in FIG. 1(*e*)) the data downloaded to the mobile phone 20 by the interactive information provider 2 is forwarded to the terminal 18, thereby allowing the last page viewed by the shopper to be reproduced on the display 36 of the terminal 18 and thus enabling the shop assistant to identify the exact pair of shoes the shopper wishes to try on.

The data transmitted to the terminal 18 (from the interactive information provider 2 and/or from the mobile phone 20) of course may not be an exact reproduction of the last screen viewed by the shopper and could, for example, cause the terminal 18 to display on its display screen 36 other information, such as for example other products viewed by the shopper, earlier screens viewed by the shopper rather than, or in addition to the last screen viewed by the shopper, products related to the products viewed by the shopper, products that might be worn with, or accessories to the product viewed by the shopper, etc.).

Furthermore the data transmitted to the terminal 18 need not contain all the data required to reproduce the image(s) of interest and can, for example, contain only partial information that is sufficient to cause the terminal 18 to retrieve from its own memory the remaining information for display on the display screen 36 of the terminal 18.

For example, the data transmitted to the terminal 18 may simply comprise a bookmark or other pointer to a page stored in the memory of the terminal 18, etc.

Once the shopper has, for example, tried on the shoes, they may wish to purchase the product. In a particularly preferred embodiment this can be achieved via the, or a, communications connection between the mobile phone 20 and the point of sales terminal 18.

In the present embodiment, the product has already been identified by the point of sales terminal 18 and to complete the purchase the shopper need only enable a transaction to occur from their mobile phone 20. The transaction can occur in any suitable manner known in the art, for example a Near Field Communication (NFC) application/transaction could be employed etc.

After the shopper has made a purchase, in a preferred embodiment, the terminal 18 then offers to the shopper further data for download to the mobile phone 20.

For example, in a preferred embodiment, since the shopper has made a purchase, a voucher for a discount from further purchase could be offered, and/or the shopper could be offered details of other products for sale, or for example details of next season's products/collection etc.

As in the manner of previous transactions, it is preferable that the shopper is offered the option of whether to allow such a download (via the terminal and/or via the display 22 of the mobile phone 20). If the shopper wishes to accept the download, this can be indicated by pressing the acceptance key 24 or if the shopper does not wish to receive the additional information, this can be indicated using a decline key 26.

Of course, any of the other keys 28 on the mobile phone 20 could be used to indicate acceptance or otherwise of a download, or to indicate which of numerous listed downloads they might wish to receive, etc. or other input means could alternatively or additionally be used, for example such as voice interaction (via, for example, the speech recognition module of the mobile phone 20 or of the terminal 18), or touch-screen display interaction (at the terminal 18 and/or of the display 22 of the mobile phone 20), etc.

Furthermore the download need not be stored in the memory of the mobile phone 20 and could instead simply be streamed or sent directly from the terminal 18 to the mobile phone 20 and if the shopper wishes to retain the download, they can transmit their acceptance to the download being stored in the memory of the mobile phone 20 in the usual manner.

Furthermore it is clearly in accordance with alternative embodiments that there may be provided in the shop a dedicated or other display for displaying information transmitted thereto by the interactive information provider 2 and/or by a shopper's mobile communications device that need not necessarily be a point of sale, and indeed it is envisaged that a dedicated display having no other function than to display the above type of information could be provided in one or more locations.

A further embodiment of the present invention will now be described with reference to FIG. 2. This embodiment can be used separately from or in conjunction with the embodiments discussed above in relation to FIGS. 1(*a*) to 1(*e*).

As shown in FIG. 2, a mobile communications device such as a mobile phone 20 can be used with an interactive information device 2. In a preferred embodiment, the interactive information device 2 comprises a touch-sensitive plasma or LCD or other suitable display 2, for example as discussed in the previous embodiments.

The user of the mobile phone 20 can interact with the touch-sensitive display 2, for example by selecting options offered for selection on the touch-sensitive display 2 by touching the appropriate region of the display 2.

However, the user can additionally or alternatively interact with the touch-sensitive display 2 as shown in FIG. 2 using the mobile phone 20.

In FIG. 2(*a*), the touch-sensitive display 2 is showing "Display A". The mobile phone 20 communicates with the touch-sensitive display 2 using any suitable communications means (for example as discussed above). In a particularly preferred embodiment, the mobile phone 20 communicates wirelessly with the touch-sensitive display 2 as shown in FIG. 2(*b*).

The interaction between the devices can, for example, be enabled by running a suitable application on the touch-sensitive display 2 and/or on the mobile phone 20. If the user of the mobile phone 20 wishes to change the display of the touch-sensitive display 2, for example from "Display A" to "Display B", the user can do so simply by selecting the appropriate option 40 as shown for example, on the display screen 22 of the mobile phone 20.

The display of the touch-sensitive display 2 is thus changed to "Display B" as requested (and as shown in FIG. 2(*c*)). Of course, additional methods of interacting with (and/or navigating about) the touch-sensitive display 2 and/ or with the mobile phone 20 are also envisaged as within the scope of the invention, for example the interaction could be via voice/speech recognition, using bookmarks or other pointers stored, for example, in the mobile phone, viewing the last screen shown or other preferred displays etc.

A further embodiment of the present invention will now be described with reference to FIG. 3. This embodiment can be used separately from or in conjunction with the embodiments discussed above in relation to FIGS. 1(a) to 1(e) and FIG. 2.

Indeed, in the particular embodiment described in relation to FIG. 3, the steps disclosed are carried out after the steps carried out by the system of FIG. 2, namely the mobile phone 20 in FIG. 3 has already interacted with the touch-sensitive display 2 such that "Display B" is shown on the screen 3 of touch-sensitive display 2.

As shown in FIG. 3, in a preferred embodiment there is provided at least one, and in this embodiment, four, further information devices. The further information devices in this embodiment are dumb terminals 48, i.e. the terminals 48 have no direct means of interaction and, for example, although they may in a preferred embodiment be displays, they are not touch-sensitive displays.

However in other preferred embodiments, one or more of the terminals 48 may have further interaction means, such as, for example, a touch-sensitive display or other input means.

In the embodiment shown in FIG. 3, each of the terminals 48 is connected, in this embodiment via a cable (but in other embodiments this could be by any suitable means, wired or wireless), to at least one other terminal 48. Terminals 48i and iii are further connected via cables to the touch-sensitive display 2.

In other embodiments, other terminals 48 can be connected to the touch-sensitive display 2 and/or any or all of the terminals 48 can be connected to a second terminal 48 and even to further terminals) 48. In this manner a network is established wherein the touch-sensitive display 2 can communicate with any one of the terminals 48, either directly or indirectly via another terminal 48.

In some embodiments, the touch-sensitive display 2 acts as a master device and the terminals 48 act as slave devices. The mobile phone 20 can be used, as discussed in relation to FIG. 2, to control the information displayed on the display screen 3 of the touch-sensitive display 2 and, preferably, the touch-sensitive display 2 and/or the mobile phone 20 can be used to further control the information displayed on one or more of the slave terminals 48. In a preferred embodiment, the touch-sensitive display 2 can cause all of the terminals 48 to display desired information.

In the present embodiment as shown in FIG. 3, the mobile phone 20 has set the touch-sensitive display 2 to show "Display B" and furthermore the mobile phone 20 sends a command 42 to the touch-sensitive display 2 to set the second terminal 48 (terminal ii) to also show "Display B".

As shown in this embodiment the mobile phone 20 can interact with the touch-sensitive display 2 to set the display of, for example, one of the terminals 48. However, in a further preferred embodiment (not shown) the touch-sensitive display 2 controls what is displayed by each of the terminals 48.

The touch-sensitive display 2 decides what is to be displayed on each terminal 48 in response to interactions between the touch-sensitive display 2 and the mobile phone 20.

During these interactions, the touch-sensitive display 2 builds and stores a profile of the user of the mobile phone 20, storing information such as they type or categories of information the user likes to view, how often the user views relevant information, time related information such as at what times of the day/days of the week etc., the user tends to view information, whether the user generally prefers visual information (images, videos etc.) and/or textual information, etc. This profile is then used to determine what information is displayed to the user on the touch-sensitive display 2 and furthermore is used to instruct the other terminals 48 how data should be displayed to the user.

For example, if the user generally tends to be in the vicinity of terminal 48 iii at a particular time of day every working week day (for example in a preferred embodiment, terminal 48 iii might be located near a cafeteria where the user goes for lunch) then at that time of day the terminal 48 iii may be controlled by touch-sensitive display 2 to display information that is within one of the categories of interest of the user (for example with regard to the shopper embodiment, it may display information to the user regarding a shoe sale on at the shop from which the user recently purchased a pair of shoes or for example any special offers that the touch-sensitive display 2 determines the shopper might wish to see, etc.).

The master touch-sensitive display 2 can control any one of, some of or all of the terminals 48 to display particular information and to modify the information according to any one or more parameters stored in the user profile as determined by the touch-sensitive display 2.

It is further envisaged that the touch-sensitive display 2 can control, for example, one terminal 48 to display certain information and at least one of the other terminals 48 to display different information, etc.

In a further embodiment, in addition to the displays of the terminals 48 being determined by the touch-sensitive display 2, each terminal 48 could additionally or alternatively be controllable by the mobile phone 20 by interaction therewith.

In this case the terminals 48 are not "dumb" in that they must have means (e.g. a communication module, for example a Bluetooth module, a general packet radio service (GPRS) module or the like) for communicating with the mobile phone 20. The mobile phone 20 can interact with any one of the terminals 48 in this embodiment to control, or to further control, what is displayed on any of the terminals 48 and indeed on the touch-sensitive display 2.

In a still further embodiment, the above network (and/or any other suitable network) can be controlled by the touch-sensitive display 2 and/or by the mobile phone 20 to determine how one or more interactive information devices 2 (which can take the place of one or more of the terminals 48) interact with a user of the mobile phone 20.

For example, if terminal 48 iv is, say, also a touch-sensitive display, then in a preferred embodiment the touch-sensitive display 2 provides profile data to the touch-sensitive display 48 iv, which is used to control how the touch-sensitive display 48 iv interacts with the mobile phone 20. For example, the user of the mobile phone 20, upon approaching the touch-sensitive display 48 iv, might be offered customised menus of options for selection, and/or might be shown the last page displayed on the touch-sensitive display 2 as a starting point for navigation etc.

In a particularly preferred embodiment, the information offered to a user of a mobile phone 20 at any one or more of the terminals 48 is based at least partially on the geographical location of the user at the present time and/or on previous geographical locations to which the user has been, and/or the length of time spent at each location, and/or on the route that the user is presently taking. For example, if the information displayed to the user is based on the route that the user is taking (determined by, for example, tracking the places that the mobile phone 20 has been detected in chronologically) then the information displayed on the terminal 48 to which the user is closest could relate for example, to shops that the user is about to reach and that sell the products that the user generally prefers.

The positional information regarding the user, and in particular regarding the user's mobile phone 20 or other mobile communications devices, is preferably determined using one or more global positioning system (GPS) receivers or other suitable means and/or using the wireless protocols with which the devices interact.

The above embodiments relate to systems/networks having at least one interactive information provider and preferably one or more further information devices having a display. However in accordance with a further embodiment of the present invention, the further information devices do not have a display and rather are simply devices having information stored thereon.

In a particularly preferred embodiment, the further information devices are tags 50, as shown in FIG. 4, although of course references to tags in relation to FIG. 4 are not intended to be exclusive and one or more of the tags may be replaced by any other suitable information device having data stored thereon.

As shown in FIG. 4, several tags 50 are provided. The tags 50 have no direct means of communication with an interactive information provider 2, which in this embodiment is again a touch-sensitive display 2 having a memory containing detailed data regarding a variety of products, services, etc. In this particular embodiment, the touch-sensitive display 2 is located in a clothing store.

The tags 50 cannot communicate with the touch-sensitive display 2 directly because, for example, they are placed out of the communications range of the touch-sensitive display 2, and/or they do not have a suitable module for communications with the touch-sensitive display 2, and/or because communication between each tag 50 and the touch-sensitive display 2 is intentionally blocked, and/or for some other appropriate reason. Each tag 50 is associated with a product located in the clothing store. Of course, for embodiments in which the touch-sensitive display 2 and the tags 50 are not for use in a clothing store, the tags 50 are associated with other appropriate means or the like. In the clothing store example, there may be a tag 50 for example associated with each set of products. In the embodiment shown in FIG. 4, Tag 2 is associated with a pair of shoes on a shelf in the store.

As a shopper carrying a mobile communications device (here again it is a mobile phone 20, but any suitable device can be used with this embodiment, as with all previous embodiments) approaches a product with which a tag 50 is associated (here, the shopper approaches the shoes associated with Tag 2), the tag 50 detects the presence of the mobile phone 20 that the user is carrying. The detection of the mobile phone 20 may be carried out in any suitable manner and in some embodiments, the detection is carried out in conjunction with (or immediately before) establishing a, for example, wireless, e.g. Bluetooth, connection between the tag 50 and the mobile phone 20. Alternatively in a particularly preferred embodiment the detection is carried out by the tag 50 continuously scanning for mobile devices and retrieving from the phone 20 an identifier when the phone's presence is detected. This does not necessarily require a communications connection between the tag 50 and the phone 20 to be established.

When the tag 50 detects the presence of the mobile phone 20 (and in some embodiments, establishes a connection with the phone 20), information stored on the tag 50 is transmitted to the mobile phone 20. The mobile phone 20 then communicates with the touch-sensitive display 2 to transfer the information to the touch-sensitive display 2. In this manner an indirect communication is made between the tag 50 and the touch-sensitive display 2.

The information sent to the touch-sensitive display 2 can then be automatically displayed on the screen 3 of the touch-sensitive display 2. This is an advantageous arrangement because this allows the tags 50 to be located within range of the touch-sensitive display 2 but without causing the information of the tag 50 to be displayed on the touch-sensitive display 2 unless a user is present and in close proximity with the tag 50 of interest.

Therefore only information that is of interest to the user (indicated by the user approaching the tag 50 associated with the item of interest) is displayed on the touch-sensitive display 2.

This is particularly advantageous, for example, in the shopping example as the user can approach a product in a shop and if the product has a tag associated therewith (in the FIG. 4 embodiment, Tag 2 is associated with a pair of shoes) then information about that product can be displayed on the touch-sensitive display 2 by interaction via the shopper's mobile phone 20.

As shown in FIG. 4, in this embodiment, by approaching the shoes, information is automatically displayed on the touch-sensitive display 2 showing, for example, an image of the shoes 52 (so that the shopper can be confident that the information relates to the product in which the shopper is interested), the price of the product and the sizes that the shop has in stock (if the shopper's size is not available, they need not waste time approaching a shop assistant in an attempt to try on the product).

The data stored on the tag 50, and therefore the data transferred via the mobile phone 20 to the touch-sensitive display 2, should he of a relatively small size because not only is it highly desirable for the data transfer to be rapid (and it is well known that large document transfers obviously take longer than smaller document transfers over the same communications connection) but also because it may be necessary at least temporarily to store the data on the mobile phone 20, and therefore it is undesirable to fill the memory of the mobile phone 20, and indeed may result in failure of the inventive method if there is insufficient capacity in the memory of the mobile phone to carry out the transfer.

Furthermore it may be necessary to install an application in the mobile phone 20 to carry out the transfer and therefore it is further desirable to minimise any further storage requirements for successful transfer of the data.

Therefore in a particularly preferred embodiment, the data stored on the tags 50 need not contain all the information for display on the touch-sensitive display 2 and instead the data may comprise a pointer or bookmark to data stored on the touch-sensitive display 2. In this manner, the data that is transmitted to the touch-sensitive display 2 via the mobile phone 20 causes the touch-sensitive display 2 to retrieve the relevant information to be displayed from a memory therein for display on the screen 3 of the touch-sensitive display 2.

In the above embodiment, the data stored in the tag 50 causes relevant information to be displayed on the touch-sensitive display 2 as the shopper, and thus the shopper's mobile phone 20, comes within range of a particular tag 50. However it is envisaged as being within the scope of the present invention for the relevant information, or at least parts thereof, to be additionally or alternatively displayed on the mobile phone 20.

This can be achieved by receiving the information from the tag 50 as it is transmitted via the mobile phone 20 and/or by downloading the relevant information from the touch-sensitive display 2. In the embodiment as shown in FIG. 4 for example, part of the information displayed on the screen of the touch-sensitive display 2 is an option 58 for the shopper to purchase the item of interest, in this case, a pair of shoes.

By pressing the relevant part of the touch-sensitive display 2, the shopper can rapidly purchase the product, preferably by a transaction carried out with the mobile phone 20, such as a NFC transaction, thereby enabling the shopper to buy the shoes without need of cash, credit cards or the like. In a preferred embodiment as shown, the shopper can additionally or alternatively purchase the product using the partial information displayed on the mobile phone 20.

Therefore if the shopper wishes to buy the shoes, this can be achieved simply by pressing the acceptance button 24 as discussed in relation to other embodiments. Preferably if the transaction is to be carried out in this manner, the transaction is a suitable wireless transaction such as a NFC transaction.

In an alternative arrangement of the FIG. 4 embodiment, as shown in FIG. 5 (in which many of the features are the same and the above description therefore equally applies to this embodiment unless contrary thereto), the tags 50 are connected to the interactive information provider (touch-sensitive display) 2, in this embodiment via cables (although this connection could for example be a wireless connection, e.g.).

However data stored in the tags is only transmitted to the touch-sensitive display 2 when the tag 50 determines that a mobile communications device (e.g. mobile phone 20 again) is in close proximity to it, which can be detected in any of the manners discussed above. As for the earlier embodiment, the data stored in the tag is relatively small (thus reducing the cost and power consumption of the tags 50 and thereby enabling a large number to be inexpensively provided) and transmission of the data to the touch-sensitive display 2 causes the data to be displayed to be retrieved from the memory of the touch-sensitive display 2.

In this and all the other embodiments this is particularly advantageous because it is therefore only necessary to update information at a single point (here, e.g. it is only necessary to update the touch-sensitive display 2 memory) rather than it being necessary to update each of the tags 50, when the information is to be changed.

This is particularly advantageous in the shopping example because, for example, if the price is to be changed, e.g. during a sale, then this can be readily achieved by updating the memory of the touch-sensitive display 2 (e.g. remotely from a server to which the touch-sensitive display 2 is connected and/or directly at the touch-sensitive display 2) rather than needing to find the tag 50, remove it from the product, connect it to a processor and change the data for each tag 50.

The tag 50 therefore need only, for example, contain a product indicator, such as a product code. Again in the FIG. 5 embodiment, the mobile phone 20 can additionally display at least some of the information relating to the tag 50, by interaction with the tag 50 and/or indirectly with the touch-sensitive display 2 via the tag 50.

It should be noted that references in the above embodiments to a mobile phone are not meant to be limiting and of course any other suitable mobile communications device could be used instead of, or in addition to, a mobile phone.

Furthermore references in the above embodiments to a touch-sensitive display are not meant to be limiting and of course any suitable interactive information provider could be used such as, for example a touch-sensitive plasma display, and/or a touch-sensitive LCD display, etc.

In all of the above embodiments, the interactive information provider (and/or any of the other information devices) may be a standalone information centre, for example having a memory that can be updated only by direct interaction with the interactive information provider (using for example an administrator program on a, for example, laptop wired to the interactive information provider) but more preferably the interactive information provider is connected to a server, preferably a remote server such that it can be updated remotely.

The connection to the server can be wired and/or wireless. The other information devices can additionally or alternatively be connected to the same and/or different servers as appropriate.

In all of the above embodiments, each interactive information provider has at least one means for communicating with a mobile communications device and preferably each interactive information provider has a plurality of different communication means, so that each interactive information provider can communicate with any mobile communications devices by any of a wide range of protocols and means.

Preferably at least some of the further information devices also have at least some, if not all, of the required communications modules in order that they can also communicate with any mobile communications devices.

In all of the above embodiments, the interactive information providers and/or the further information devices, and/or the mobile communications devices can have any suitable peripheral or other means associated therewith (preferably integrally provided therewith).

For example, the devices may further comprise any one or more of audio means (one or more speakers and/or microphones), card reader(s), remote control devices, expansion slots/units, voice control units, and other suitable control units, etc.

The invention claimed is:

1. A method of providing information using an interactive information device, the method comprising:
   displaying information on the interactive information device, the information selected from a memory of the interactive information device;
   establishing a communications connection between the interactive information device and a mobile communications device;
   transmitting data between the interactive information device and the mobile communications device; and
   displaying information on a second interactive information device when the mobile communications device comes within a communications range of a tag device associated with an item in proximity to the mobile communications device.

2. The method of claim 1, further comprising receiving an input from a user, wherein said input is indicative of information selected by said user for display on the interactive information device.

3. The method of claim 1, further comprising:
   transmitting data from the interactive information device to the mobile communications device, wherein the data includes information to be displayed by the mobile communications device.

4. The method of claim 3, further comprising displaying the transmitted data on a display of the mobile communications device.

5. The method of claim 3, further comprising, prior to transmission to the mobile communications device, configuring the data to be transmitted for compatibility with a display of the mobile computing device.

6. The method of claim 1, further comprising transmitting data previously received by the mobile communications device to the second interactive information device.

7. The method of claim 6, wherein the data is transmitted through a different information device to the second interactive information device from which the data was received.

8. The method of claim 1, wherein the transmitted data comprises data identifying information displayed on the display of the interactive information device.

9. The method of claim 1, further comprising the interactive information device identifying and retrieving data from the memory in response to receiving data from the mobile communications device.

10. The method of claim 1, further comprising automatically displaying on the second interactive information device a previously displayed screen when the mobile communications device comes within the communications range of the second interactive information device.

11. The method of claim 1, further comprising:
establishing a transaction communication between the mobile communications device and the second interactive information device; and
performing a transaction associated with the particular information displayed on the display of the second interactive information device.

12. The method of claim 1, further comprising:
the interactive information device transmitting data relating to an interaction with a user to at least one further information device.

13. The method of claim 1, further comprising:
determining at least one of user information and preference data in response to interactions between the mobile communications device and the interactive information device; and
using the at least one of user information and preference data as control parameters for modifying information prior to its display.

14. The method of claim 1, further comprising at least one further information device that functions as a data storage device, wherein:
the further information device transmits at least stored data to at least one of the mobile communications device within a communication range and an information display device.

15. The method of claim 14, wherein the data that is stored and transmitted by the further information device relates to at least one of a product and a service.

16. The method of claim 1, further comprising:
an information device detecting the presence of the mobile communications device; and
transmitting data to at least one of the detected mobile communications device and another information device in response to such detection.

17. The method of claim 1, wherein the step of establishing a communications connection between the interactive information device and the mobile communications device further comprises:
establishing a first communications connection between the mobile communications device and an intermediate device; and
establishing a second communications connection between the intermediate device and the interactive information device.

18. The method of claim 1, wherein the mobile communications device comprises a mobile telephone.

19. The method of claim 1, wherein the interactive information device comprises one of a plasma screen display and an LCD display.

20. The method of claim 1, wherein the interactive information device comprises a touch-sensitive display.

21. The method of claim 1, wherein the step of establishing a communications connection between the interactive information device and the mobile communications device further comprises establishing a short-range wireless connection between the interactive information device and the mobile communications device.

22. A system for providing information to at least one user, the system comprising:
an interactive information device comprising:
a memory accessible for storing information selectable for display;
a display for displaying information; and
means for establishing a communications connection between the interactive information device and a mobile communications device, wherein data is transmitted between the mobile communications device and the interactive device via the communications connection;
a second interactive information device configured to display information when the mobile communications device comes within a communications range of a tag device associated with an item in proximity to the mobile communications device.

23. The system of claim 22, wherein the interactive information device is configured for enabling a user to select information for display on the interactive information device.

24. The system of claim 22, wherein the interactive information device further comprises a touch-sensitive display.

25. The system of claim 22, further comprising at least one further information device.

26. The system of claim 25, wherein at least one of the further information devices comprises a display and means for establishing a communications connection with at least one of the interactive information device and the mobile communications device.

27. The system of claim 22, wherein the second interactive information device is configured for automatically displaying a previously displayed screen when the mobile communications device comes within a communications range of the second interactive information device.

28. The system of claim 22, further comprising:
means for establishing a transaction communication between the mobile communications device and the second interactive information device, wherein a transaction associated with information displayed on a display of the second interactive information device can be performed via the transaction communication.

29. The system of claim 22, wherein the second interactive information device transmits data relating to an interaction with a user to at least one further information device.

30. The system of claim 22, wherein the second interactive information device comprises:
means for determining at least one of user information and preference data in response to interactions between the mobile communications device and the information device; and means for using at least one of the user information and preference data as control parameters for modifying information prior to its display.

31. The system of claim 22, further comprising:
at least one further information device that function as a data storage device, wherein:
at least one of the further information devices is configured to transmit at least stored data to at least one of the mobile communications device within a communication range, and a second information device having a display.

32. The system of claim 31, wherein the data that is stored and transmitted by the further information device is associated with at least one of a product and a service.

33. The system of claim 22, further comprising a second information device configured to detect the presence of the mobile communications device and transmit data to at least one of the detected mobile communications device and another information device in response to such detection.

34. The system of claim 22, wherein the means for establishing a communications connection between the interactive information device and the mobile communications device establishes a communications connection between the mobile communications device and an intermediate device; and further establishes a communications connection between the intermediate device and the interactive information device.

35. The system of claim 22, wherein the mobile communications device comprises a mobile telephone.

36. The system of claim 22, wherein the interactive information device comprises at least one of a plasma screen display and an LCD display.

37. The system of claim 22, wherein the means for establishing a communications connection between the interactive information device and the mobile communications device establishes a short-range wireless connection between the interactive information device and the mobile communications device.

38. A method of providing information using an interactive information device, the method comprising:
displaying information on the interactive information device, the information selected from a memory of the interactive information device;
establishing a communications connection between the interactive information device and a mobile communications device;
transmitting data between the interactive information device and the mobile communications device via the communications connection; and
a second interactive information device automatically displaying a screen previously displayed by the interactive information device when the mobile communications device comes within the communications range of the second interactive information device.

39. The method of claim 38, further comprising:
determining at least one of user information and preference data in response to interactions between the mobile communications device and the interactive information device; and
using the at least one of user information and preference data as control parameters for modifying information prior to its display.

40. The method of claim 38, further comprising at least one further information device that functions as a data storage device, wherein:
the further information device transmits at least stored data to at least one of the mobile communications device within a communication range and an information display device.

41. The method of claim 38, further comprising:
an information device detecting the presence of the mobile communications device; and
transmitting data to at least one of the detected mobile communications device and another information device in response to such detection.

42. The method of claim 41, wherein the data that is stored and transmitted by the further information device relates to at least one of a product and a service.

43. The method of claim 38, wherein the step of establishing a communications connection between the interactive information device and the mobile communications device further comprises:
establishing a first communications connection between the mobile communications device and an intermediate device; and
establishing a second communications connection between the intermediate device and the interactive information device.

44. The method of claim 38, wherein the step of establishing a communications connection between the interactive information device and the mobile communications device further comprises establishing a short-range wireless connection between the interactive information device and the mobile communications device.

45. A system for providing information to at least one user, the system comprising:
an interactive information device comprising:
a memory accessible for storing information selectable for display;
a display for displaying information; and
means for establishing a communications connection between the interactive information device and a mobile communications device, wherein data is transmitted between the mobile communications device and the interactive information device via the communications connection; and
a second interactive information device for automatically displaying a screen previously displayed by the interactive information device when the mobile communications device comes within a communications range of the second interactive information device.

46. The system of claim 45, further comprising:
means for establishing a transaction communication between the mobile communications device and the second interactive information device, wherein a transaction associated with information displayed on a display of the second interactive information device can be performed via the transaction communication.

47. The system of claim 46, wherein the second interactive information device transmits data relating to the transaction.

48. The system of claim 45, wherein the second interactive information device comprises:
means for determining at least one of user information and preference data in response to interactions between the mobile communications device and the information device; and
means for using at least one of the user information and preference data as control parameters for modifying information prior to its display.

49. The system of claim 45, wherein the means for establishing a communications connection between the interactive information device and the mobile communications device establishes a short-range wireless connection between the interactive information device and the mobile communications device.

\* \* \* \* \*